United States Patent
Morikuni et al.

(10) Patent No.: US 7,841,728 B2
(45) Date of Patent: Nov. 30, 2010

(54) IMAGE DISPLAY APPARATUS

(75) Inventors: Eiji Morikuni, Matsumoto (JP);
Masatoshi Yonekubo, Hara-mura (JP);
Toshihiko Sakai, Minamiminowa-mura
(JP); Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 765 days.

(21) Appl. No.: 11/583,072

(22) Filed: Oct. 19, 2006

(65) Prior Publication Data
US 2007/0097337 A1  May 3, 2007

(30) Foreign Application Priority Data

| Oct. 20, 2005 | (JP) | ............................... 2005-305312 |
| Feb. 16, 2006 | (JP) | ............................... 2006-039303 |
| Jul. 18, 2006 | (JP) | ............................... 2006-195186 |

(51) Int. Cl.
*G03B 21/28* (2006.01)
(52) U.S. Cl. .............................. 353/99; 353/37; 353/50;
353/75; 353/77; 353/33; 353/81; 353/98;
353/12; 353/70; 348/41; 348/93; 348/94;
348/202; 348/781; 348/782; 359/629; 359/630;
359/631; 359/632; 359/633; 359/460; 359/834;
359/857; 359/358; 359/861
(58) Field of Classification Search .................... 353/70,
353/82, 99, 37, 50, 77, 75, 97, 98, 81, 33,
353/12, 47, 48, 49, 64, 66, 71, 73, 74, 100,
353/101, 119; 359/41, 93, 94, 202, 629,
359/630, 631, 632, 633, 634, 635, 636, 637,
359/638, 639, 640; 348/41, 93, 94, 202,
348/744, E9.025, E9.027, 781, 782
See application file for complete search history.

(56) References Cited

U.S. PATENT DOCUMENTS

| 4,918,535 | A | * | 4/1990 | Grabis et al. ................. 348/782 |
| 6,109,751 | A | | 8/2000 | Hashizume et al. |
| 6,502,942 | B2 | * | 1/2003 | Mori et al. .................... 353/74 |
| 2001/0050758 | A1 | | 12/2001 | Suzuki et al. |
| 2007/0216877 | A1 | * | 9/2007 | Sacre et al. ................... 353/97 |

FOREIGN PATENT DOCUMENTS

| JP | A 61-275831 | 12/1986 |
| JP | A 7-281297 | 10/1995 |
| JP | A 2002-207168 | 7/2002 |
| JP | A 2002-207190 | 7/2002 |
| JP | A 2005-084576 | 3/2005 |
| KR | 1999-0076892 A | 10/1999 |

* cited by examiner

*Primary Examiner*—Georgia Y Epps
*Assistant Examiner*—Sultan Chowdhury
(74) *Attorney, Agent, or Firm*—Oliff & Berridge, PLC

(57) ABSTRACT

An image display apparatus 100 that displays an image using a light modulated according to an image signal includes a projection optical system 90 that includes a projection lens 20, a first mirror 30 that reflects a light from the projection lens 20, and a second mirror 40 that widens an angle of a light from the first mirror 30 by reflecting the light, and projects the light modulated according to the image signal from an optical engine unit 10; a third mirror 50 that reflects a light from the projection optical system 90; and a screen 50 that transmits a light from the third mirror 50. The projection lens 20 and the second mirror 40 are arranged in such a manner that an optical axis of the projection lens 20 substantially matches an optical axis of the second mirror 40, and shift the light from the optical engine unit 10 to a specific side from the optical axis of the projection lens 20. It is possible to cause a light to travel accurately, to display an image, in a thin structure with a small non-display section adjacent to a screen.

26 Claims, 24 Drawing Sheets

FIG.4
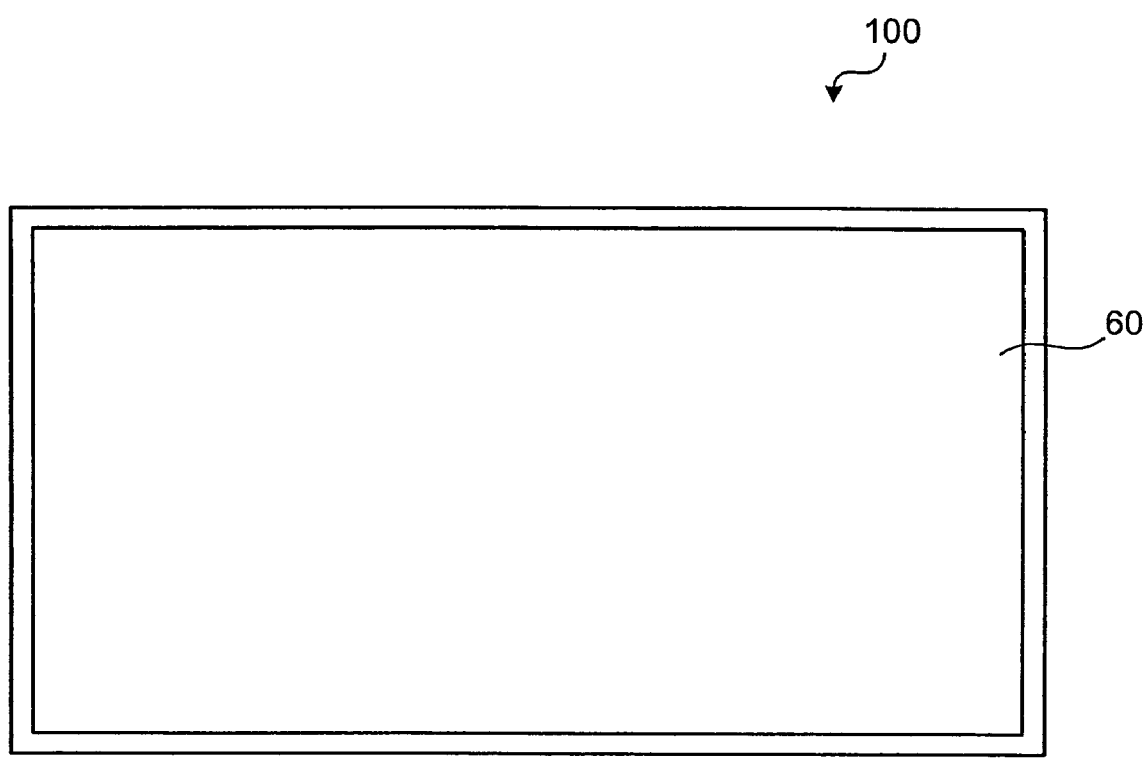
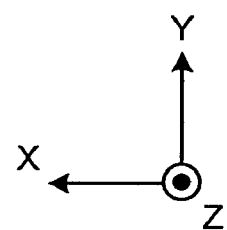

IMAGE DISPLAY APPARATUS

BACKGROUND OF THE INVENTION

1. Field of the Invention

The present invention relates to an image display apparatus, and, more particularly to a technology for an image display apparatus that displays an image by transmitting light corresponding to an image signal through a screen.

2. Description of the Related Art

In an image display apparatus that displays an image by transmitting light corresponding to an image signal, for example, a rear projector, a reduction in thickness of a housing is realized by making the light obliquely incident on a screen (see, for example, Japanese Patent Application Laid-Open No. S61-275831, Japanese Patent Application Laid-Open No. 2005-84576, and Japanese Patent Application Laid-Open No. 2002-207190).

In the image display apparatus, for improvement of designability and the like, it is desired to make a non-display section adjacent to the screen as small as possible. There is also an advantage that it is possible to display a large image with a small housing by forming the non-display section adjacent to the screen as small as possible. For example, in the structure shown in FIG. 8 of Japanese Patent Application Laid-Open No. S61-275831, since an optical engine unit and a project lens are housed in a space below the screen in the housing, a large non-display section is formed. In the structure proposed in Japanese Patent Application Laid-Open No. 2005-84576 and the structure proposed in Japanese Patent Application Laid-Open No. 2002-207190, a non-display section below a screen is reduced by arranging an optical engine unit and the like on the rear side of the screen. Concerning both the technologies of Japanese Patent Application Laid-Open No. 2005-84576 and Japanese Patent Application Laid-Open No. 2002-207190, it is considered that it depends on arrangement of respective units of an optical system, in particular, an aspherical mirror and a projection optical system whether it is possible to accurately cause light to travel in the entire structures disclosed. However, there is no specific definition about the arrangement of the respective units of the optical system in the documents described above. Therefore, according to the conventional technologies, there is a problem in that it is impossible to accurately cause light to travel to pass through a desired optical path depending on the arrangement of the respective units and the optical system itself is not effective.

The present invention has been devised in view of the problem and an advantage of some aspects of the present invention is to provide an image display apparatus in which a non-display section adjacent to a screen is small and that is capable of accurately causing light to travel to display an image in a thin structure.

SUMMARY OF THE INVENTION

To solve the above problems and to achieve the object, according to the present invention, it is possible to provide an image display apparatus that displays an image using a light modulated according to an image signal, including a projection optical system that projects the light modulated according to the image signal from an optical engine unit, and includes a projection lens, a first mirror that reflects a light from the projection lens, and a second mirror that widens an angle of a light from the first mirror by reflecting the light; a third mirror that reflects a light from the projection optical system; and a screen that transmits a light from the third mirror. The projection lens and the second mirror are arranged in such a manner that an optical axis of the projection lens substantially matches an optical axis of the second mirror, and shift the light from the optical engine unit to a specific side from the optical axis of the projection lens.

It is possible to further reduce the thickness of the image display apparatus as light is caused to travel further in a direction along a screen surface in a housing. In the present invention, it is possible to set traveling directions of light the same using a shift optical system that shifts light to a specific side from an optical axis. By irradiating light in the same direction along the screen surface, it is possible to reduce the thickness of the image display apparatus and make it easy to control a traveling direction of light. When light from the second mirror is caused to travel in an upward direction, the image display apparatus has a structure for bending an optical path in a downward direction with the third mirror. By providing the third mirror in an upper part of the housing, it is possible to prevent the housing from being increased in size in the vertical direction and prevent a large space from being secured on a lower side of the screen in the housing. When light is caused to travel in the upward direction by being bent at about πdegrees in the second mirror, the light is made incident on the second mirror from the lateral direction. When the image display device is constituted to bend light traveling from below with the first mirror, it is possible to displace the optical engine unit to the lower part of the housing. Therefore, it is possible to prevent contact of the optical engine unit and the screen and reduce the length in the thickness direction of the housing. It is possible to reduce a size of the housing by bending the optical path with the first mirror and the third mirror.

In the structure of the present invention, it is possible to divide lenses and mirrors in a projection optical system without mixing the lenses and the mirrors. It is possible to easily adjust positions and the like of the respective units and reduce manufacturing cost by dividing the lenses and the mirrors. Moreover, it is possible to adopt a usual design method for a coaxial system by arranging the projection lens and the second mirror such that an optical axis of the projection leans and an optical axis of the second mirror substantially coincide with each other. This makes it possible to reduce design manhours for an optical system and realize an optical system having less aberration. Consequently, an image display apparatus in which a non-display section adjacent to a screen is small and that is capable of accurately causing light to travel to display an image in a thin structure is obtained.

According to an aspect of the present invention, it is desirable that an optical axis of the screen substantially coincides with the optical axis of the projection lens and the optical axis of the second mirror. It is possible to adopt the usual design method for the coaxial system by causing the optical axis of the projection lens, the optical axis of the second mirror, and the optical axis of the screen to coincide with one another. This makes it possible to reduce design manhours for an optical system and realize an optical system having less aberration.

According to another aspect of the present invention, it is desirable that the first mirror and the second mirror are constituted such that an incidence plane of the first mirror and a portion of the second mirror on which light from the first mirror is made incident form substantially parallel lines in a section that includes a normal of the screen and is substantially orthogonal to the third mirror. When the optical engine unit is arranged right under the third mirror, it is possible to bend the optical path at about 90 degrees in the first mirror and the second mirror, respectively. According to this form, it is possible to bend the optical path at about 90 degrees in the first mirror and the second mirror, respectively, in a state in which the first mirror and the second mirror are set closest to each other. In the present invention, the traveling directions of light are set the same by using the shift optical system. This makes it possible to accurately control the traveling directions of light with the first mirror and the second mirror. It is possible to further reduce the thickness of the image display apparatus by setting the first mirror and the second mirror close to each other.

According to still another aspect of the present invention, it is desirable that a ray of light traveling from the second mirror to the third mirror is substantially parallel to the screen. In a coaxial optical system in which an optical axis of a projection lens, an optical axis of a second lens, and an optical axis of a screen are caused to substantially coincide with one another, light is caused to travel from the second mirror to the third mirror substantially in parallel to the screen. Consequently it is possible to reduce the thickness of the image display apparatus.

According to still another aspect of the present invention, it is desirable that the projection optical system is constituted to make light from the projection lens bent at about 90 degrees in the first mirror incident on the second mirror. When the image display apparatus is constituted to bend an optical path at about 90 degrees in the first mirror and the second mirror, respectively, it is possible arrange the optical engine unit in a position right under the third mirror. When an optical path is bent at about 90 degrees in the first mirror and the second mirror, respectively, it is possible to set the first mirror and the second mirror closest to each other. This makes it possible to reduce the length in the thickness direction of the housing and reduce the thickness of the image display apparatus.

According to still another aspect of the present invention, it is desirable that the projection optical system is constituted by integrating the projection lens, the first mirror, and the second mirror. It is possible to determine a positional relation among the projection lens, the first mirror, and the second mirror in the projection optical system to, for example, bend an optical path at about 90 degrees in the first and the second mirror, respectively. It is possible to easily assemble the image display apparatus and adjust positions and the like of the respective units and reduce manufacturing cost by integrating the projection lens, the first mirror, and the second mirror.

According to still another aspect of the present invention, it is desirable that the third mirror is provided near an outer edge of the screen and the optical engine unit is arranged, with respect to the center of the screen, on the opposite side of the side where the third mirror is provided. For example, it is possible to arrange the third mirror in an upper part of the housing and arrange the optical engine unit in a lower part of the housing. It is possible to increase the length of an optical path from the optical engine unit to the screen. In the present invention, since the shift optical system is adopted, it is possible to increase an angle of incidence of light made incident on the screen and sufficiently secure a space on the back of the screen in the lower part of the housing. Therefore, it is possible to effectively utilize a space in the housing by arranging the optical engine unit in the lower part of the housing.

According to still another aspect of the present invention, it is desirable that both light traveling from the projection lens to the first mirror and light traveling from the second mirror to the third mirror travel in the direction along the screen. This makes it possible to reduce the length in the thickness direction of the housing and reduce the thickness of the image display apparatus.

According to still another aspect of the present invention, the optical engine unit is arranged in a position near the screen other than a position where light made incident on the screen from the third mirror is made incident. Consequently, in the thin structure, it is possible to prevent the light made incident on the screen from being blocked by the optical engine unit. It is possible to reduce a size of the non-display unit adjacent to the screen by arranging the optical engine unit on the back of the screen. In the present invention, since the shift optical system is adopted, it is possible to sufficiently secure a space on the back of the screen in the lower part of the housing. Therefore, it is possible to effectively utilize a space in the housing by arranging the optical engine unit in the lower part of the housing.

According to still another aspect of the present invention, it i s desirable that the screen has an angle converting unit that converts an angle of light from the third mirror and the angle converting unit includes first surfaces on which the light from the third mirror is made incident and second surfaces that reflect light from the first surface. This makes it possible to efficiently cause light obliquely made incident on the screen to travel in a direction of an observer.

According to still another aspect of the present invention, it is desirable that the angle converting unit has a plurality of prism sections formed by first surfaces and second surfaces and gradients of the first surfaces and the second surfaces of the respective prism sections are made uniform, respectively. In the image display apparatus, since the traveling directions of light are set the same, it is possible to efficiently cause the light in the direction of the observer by forming the prism sections including the first surfaces and the second surfaces formed at the substantially identical gradients. Since it is possible to form the respective prisms in substantially identical sectional shapes, it is possible to facilitate machining of the screen and reduce manufacturing cost. It is possible to allow light to reflect at the same efficiency in the same direction regardless of a position on the screen and reduce a difference of appearances of an image in each position on the screen.

According to still another aspect of the present invention, it is desirable that an angle of the third mirror with respect to the normal of the screen is equal to or larger than 0 degree and equal to or smaller than 10 degrees. In order to cause light reflected on the second surfaces in the direction of the observer, an angle of an incident light beam with respect to the normal of the screen is 80 degrees at the maximum. It is possible to set the angle of the incident light beam on the screen to be equal to or smaller than 80 degrees.

According to still another aspect of the present invention, it is desirable that the optical engine unit has a spatial light modulator that modulates light according to an image signal and the spatial light modulator is provided in a position on which light traveling while being shifted to a specific side from an optical axis is made incident. This makes it possible to efficiently make the light shifted from the optical axis incident on the spatial light modulator.

According to still another aspect of the present invention, it is desirable that, in the projection lens, at least one of front-group lenses is formed in a shape with a part thereof removed. When the front-group lenses constituted by usual circular lenses are used, light traveling from the third mirror to the screen may come into contact with a part of the front-group lenses. In the present invention, since the shift optical system is adopted, it is possible to remove a part of the circular lenses other than a portion where light from the optical engine unit passes. It is possible to prevent light made incident on the screen from being blocked by the projection lens by removing the portion with which the light traveling from the third mirror to the screen comes into contact. It is possible to reduce a size of the projection lens and reduce a size of the image display apparatus by removing a part of the circular lenses. It is possible to easily form the projection lens by, after storing substantially circular lenses in a lens barrel, cutting the respective lenses together with the lens barrel. When a substantially semicircular lens is used, it is possible to form two lenses at a time by dividing the usual circular lens into two. Consequently, it is also possible to reduce manufacturing cost. It is also possible to shift the projection lens in the direction of the first mirror by removing the portion with which the light traveling from the third mirror to the screen comes into contact. This makes it possible to improve accuracy of the projection lens and easily reduce aberration by reducing the length of an optical path from the projection lens to the screen.

According to still another aspect of the present invention, it is preferable that the image display apparatus has a light shielding section that shields light directly traveling in the direction of the screen from the projection optical system. When there is the light directly traveling in the direction of the screen from the projection optical system, a position where the projection optical system is provided may look bright via the screen. It is possible to reduce luminance unevenness of an image and obtain a high-quality image by shielding the light directly traveling in the direction of the screen from the projection optical system using the light shielding section. It is possible to easily set the light shielding section by, for example, bonding the light shielding section on a surface on the opposite side of a surface of the first mirror that reflects light from the optical engine unit.

According to still another aspect of the present invention, it is desirable that the screen has an angle converting unit that converts an angle of light from the third mirror, the angle converting unit includes a plurality of prism sections formed by first surfaces on which the light from the third mirror is made incident and second surfaces that reflect light from the first surface, and the prism sections are arranged in a substantial concentric shape with an optical axis as the center. In the structure of the present invention for making light with traveling directions set the same incident on the screen, the optical axis forming the center of the concentric circle in which the prism sections are arranged is located on the outside of the screen. It is possible to accurately convert the angle of the light made incident on the screen in the direction of the observer and display an image with uniform brightness by providing the prism sections arranged in the substantially concentric shape with the optical axis as the center.

According to still another aspect of the present invention, it is possible to provide an image display apparatus that displays an image by projecting light modulated according to an image signal on a surface to be irradiated. The image display apparatus has a projection optical system that includes a projection lens, a first mirror that returns light from the projection lens according to reflection, and a second mirror that widens an angle of light from the first mirror according to reflection projects light modulated according to an image signal from an optical engine unit. The projection lens and the second mirror are arranged such that an optical axis of the projection lens and an optical axis of the second mirror substantially coincide with each other. The projection lens and the second mirror cause light from the optical engine unit to travel while being shifted to a specific side from the optical axis of the projection lens.

It is possible to further reduce the thickness of the image display apparatus as light is caused to travel further in a direction along the surface to be irradiated in a housing. In the present invention, it is possible to set traveling directions of light the same with a shift optical system that shifts light to a specific side from an optical axis. It is possible to reduce the thickness of the image display apparatus by irradiating light in same the direction along the surface to be irradiated with the projection optical system and facilitate control of a traveling direction of the light. By emitting projection light in the direction along the surface to be irradiated from the second mirror, it is possible to arrange the image display apparatus in close contact with a wall surface on which the surface to be irradiated is provided. By adopting the thin structure and making it possible to arrange the image display apparatus in close contact with the wall surface, it is possible to surely prevent light traveling in a direction of an observer from the image display apparatus from being blocked by the image display apparatus or the observer. Therefore, it is possible to comfortably enjoy a video by easily setting the image display apparatus. By widening an angle of light with the second mirror, the projection optical system is capable of performing ultra-short focus projection. It is possible to arrange the image display apparatus in a position close to the surface to be irradiated and arrange the image display apparatus at a high degree of freedom by performing the ultra-short focus projection.

According to still another aspect of the present invention, it is desirable that the optical axis of the projection lens and the optical axis of the second mirror are substantially parallel to a normal of the surface to be irradiated. This makes design of an optical system easier. This makes it possible to reduce design manhours for an optical system and realize an optical system having less aberration.

According to still another aspect of the present invention, it is desirable that, in the first mirror and the second mirror, an incidence plane of the first mirror and a portion of the second mirror on which light from the first mirror is made incident are substantially parallel to each other. It is possible to more accurately control a traveling direction of light by arranging the first mirror and the second mirror substantially parallel to each other. Consequently, an image display apparatus that can be easily set at a high degree of freedom and is capable of accurately causing light to travel to display an image is obtained.

According to still another aspect of the present invention, it is desirable that both light traveling from the projection lens to the first mirror and light reflected on the first mirror travel in a direction along a rear surface portion. This makes it possible to reduce a size of the image display apparatus.

According to still another aspect of the present invention, it is desirable that the projection optical system is constituted to make light from the projection lens bent at about 90 degrees in the first mirror incident on the second mirror. When the image display apparatus is constituted to bend an optical path at about 90 degrees in the first mirror and the second mirror, respectively, it is possible arrange the optical engine unit right under an emission port from which projected light is emitted to the outside. It is possible to set the first mirror and the second mirror closest to each other. This makes it possible to reduce the thickness of the image display apparatus.

According to still another aspect of the present invention, it is desirable that the projection optical system is constituted by integrating the projection lens, the first mirror, and the second mirror. This makes it possible to easily assemble the image display apparatus and adjust positions and the like of the respective units and reduce manufacturing cost.

According to still another aspect of the present invention, it is desirable that the optical engine unit has a spatial light modulator that modulates light according to an image signal and the spatial light modulator is provided in a position on which light traveling while being shifted to a specific side from an optical axis is made incident. This makes it possible to efficiently make the light shifted from the optical axis incident on the spatial light modulator.

According to still another aspect of the present invention, it is desirable that, in the projection lens, at least one of front-group lenses is formed in a shape with a part thereof removed. In the present invention, since the shift optical system is adopted, it is possible to remove a part of a circular lens other than a portion where light from the optical engine unit passes. It is possible to reduce a size of the projection lens and reduce a size of the image display apparatus by removing a part of the circular lens. It is possible to shift the projection lens in the direction of the first mirror. It is possible to improve accuracy of the projection lens and easily reduce aberration by reducing the length of an optical path from the projection lens to the screen.

According to still another aspect of the present invention, it is desirable that the image display apparatus has a fixing section that integrally fixes the optical engine unit and the third mirror. It is possible to accurately determine relative positions of the optical engine unit and the third mirror with the fixing section as a reference. It is possible to position the optical engine unit and the third mirror at accuracy higher than that at the time when a part to which the optical engine unit is fixed and a part to which the third mirror is fixed are combined to constitute a housing. It is possible to hold a positional relation between the optical engine unit and the third mirror at high accuracy and secure high optical performance by constituting the fixing section firm. Consequently, a rear projector capable of displaying a high-quality image by securing high optical performance in a thin structure is obtained. By building the optical engine unit and the third mirror, the relative positions of which are determined, in the fixing section, it becomes easy to adjust positions of the optical engine unit and the third mirror and other optical elements. This makes it possible to easily and accurately assemble an optical system. By constituting the fixing section firm, even when the optical engine unit, which is considered heavy among the optical elements, is arranged in the upper part of the housing, it is possible to reduce deflection of the housing. Therefore, it is also possible to increase a degree of freedom in the structure of the rear projector.

According to still another aspect of the present invention, it is desirable that the image display apparatus has a housing in which at least the optical engine unit, the projection optical system, and the third mirror are housed and the fixing section is provided in the housing. It is possible to position the optical engine unit and the third mirror in the housing at high accuracy and secure high optical performance by providing the fixing section in the housing. Since only the fixing section has to be constituted firm, compared with the time when the entire housing is constituted firm, it is possible to reduce the thickness and the weight of the housing. This makes it possible to secure high optical performance in the thin and light structure.

According to still another aspect of the present invention, it is desirable that the fixing section fixes at least one of the first mirror and the second mirror. It is possible to further improve the optical performance by improving positional accuracy of at least one of the first mirror and the second mirror.

BRIEF DESCRIPTION OF THE DRAWINGS

FIG. 4 is a diagram of an external appearance of the projector viewed from the front;

DETAILED DESCRIPTION OF THE PREFERRED EMBODIMENTS

Exemplary embodiments of the present invention are explained in detail below with reference to the accompanying drawings.

Figure 1:
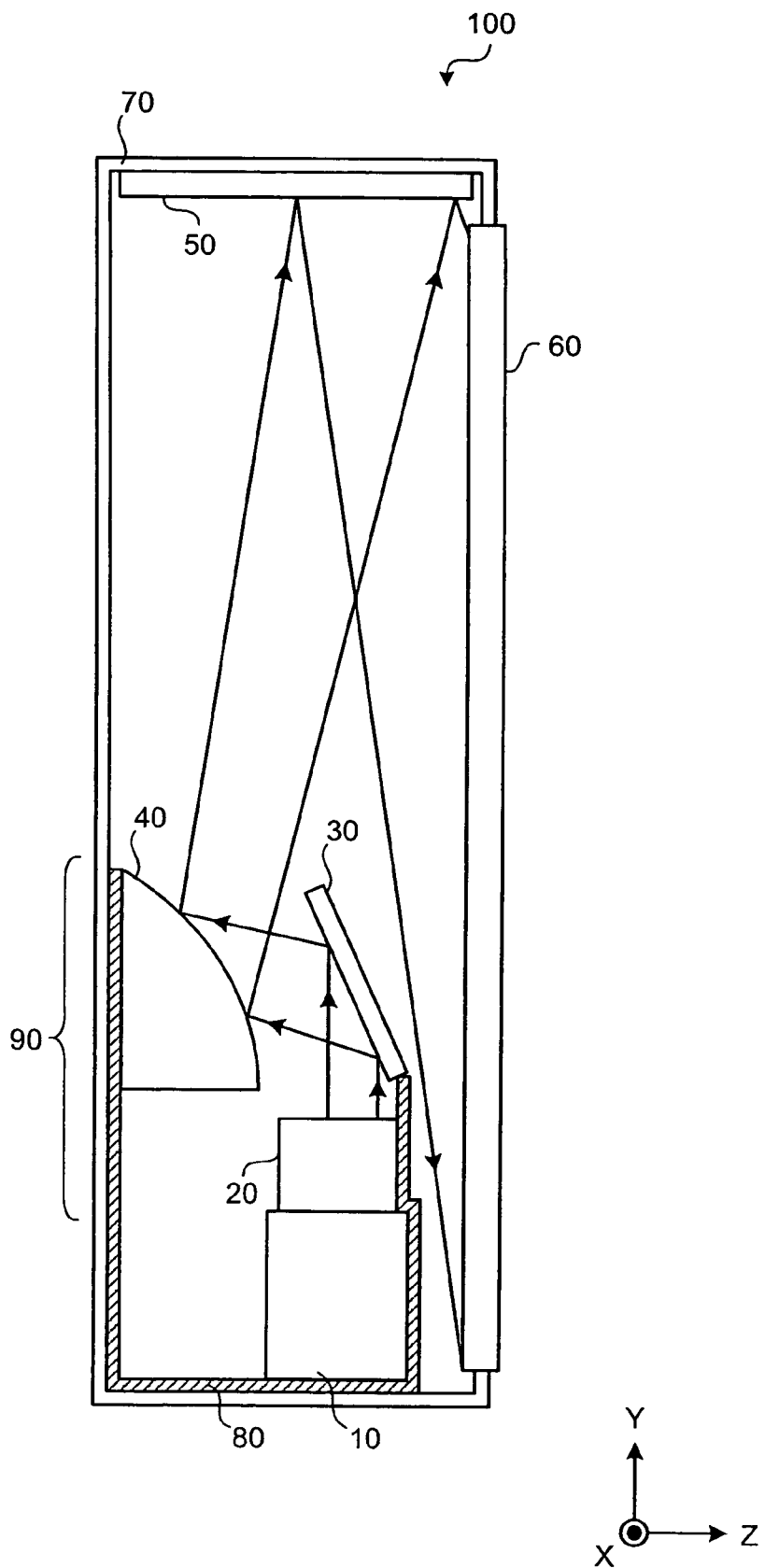
FIG. 1 is a diagram of a schematic structure of a projector according to a first embodiment of the present invention.

FIG. 1 is a diagram of a schematic structure of a projector 100 that is an image display apparatus according to a first embodiment of the present invention. A structure shown in FIG. 1 is a YZ sectional structure obtained by cutting the projector 100 in the center in an X direction. The projector 100 is an image display apparatus that displays an image by transmitting light modulated according to an image signal through a screen 60 and is a so-called rear projector. An optical engine unit 10 supplies the light modulated according to the image signal in a plus Y direction, which is an upward direction. The optical engine unit 10 is arranged on the rear side of the screen 60 and on the bottom surface of a housing 70. A projection lens 20 is attached to an emission side of the optical engine unit 10.

Figure 2:
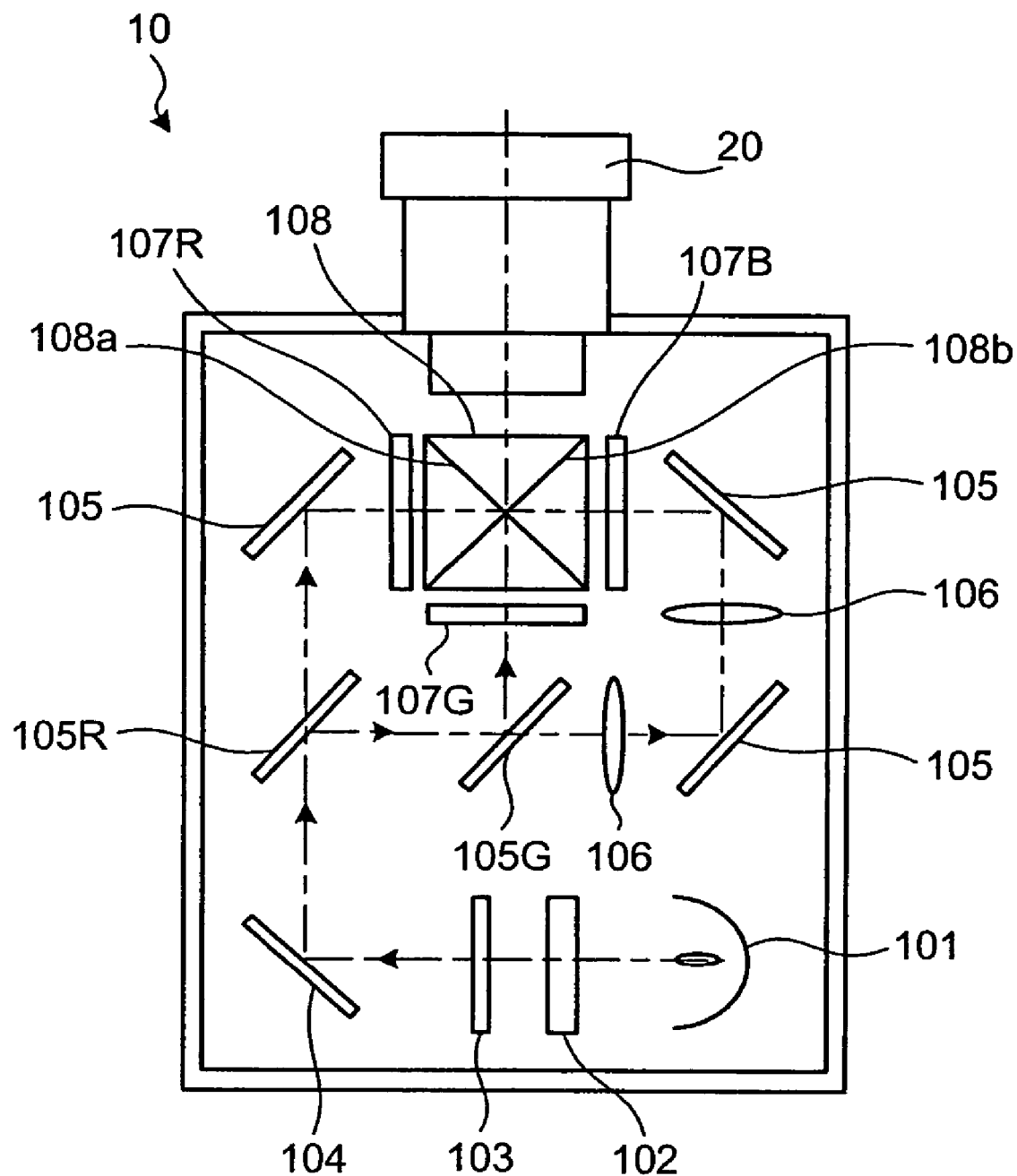
FIG. 2 is a diagram for explaining a structure of an optical engine unit.

FIG. 2 is a diagram for explaining a structure of the optical engine unit 10 with the projection lens 20 attached. An ultra-high-pressure mercury lamp 101 serving as a light source unit supplies light including red light (hereinafter, "R light"), which is first color light, green light (hereinafter, "G light"), which is second color light, and blue light (hereinafter, "B light"), which is third color light. An integrator 102 makes an illuminance distribution of light from the ultra-high-pressure mercury lamp 101 substantially uniform. The light with the illuminance distribution made uniform is converted into polarized light, for example, s polarized light having a specific oscillation direction by a polarization converting element 103.

The light converted into the s polarized light is made incident on an R-light transmitting dichroic mirror 105R after an optical path thereof is bent at 90 degrees by a reflection mirror 104. The R-light transmitting dichroic mirror 105R transmits the R light and reflects the G light and the B light. The R-light transmitted through the R light transmitting dichroic mirror 105R is made incident on a spatial light modulator 107R after an optical path thereof is bent at 90 degrees by a reflection mirror 105. The spatial light modulator 107R is a liquid crystal display device of a transmission type that modulates the R light according to an image signal. Since a polarization direction of light does not change even if the light is transmitted through a dichroic mirror, the R light made incident on the spatial light modulator 107R stays in a state of the s polarized light.

The s polarized light made incident on the spatial light modulator 107R is made incident on a not-shown liquid crystal panel. In the liquid crystal panel, a liquid crystal layer for image display is encapsulated between two transparent boards. The s polarized light made incident on the liquid crystal panel is converted into p polarized light according to the modulation corresponding to an image signal. The spatial light modulator 107R emits the R light converted into the p polarized light according to the modulation. In this way, the R light modulated by the spatial light modulator 107R is made incident on a cross dichroic prism 108 serving as a color combining optical system.

The G light and the B light reflected by the R-light transmitting dichroic mirror 105R are made incident on a B-light transmitting dichroic mirror 105G after optical paths thereof are bent at 90 degrees. The B-light transmitting dichroic mirror 105G reflects the G light and transmits the B light. The G light reflected by the B-light transmitting dichroic mirror 105G is made incident on a spatial light modulator 107G. The spatial light modulator 107G is a liquid crystal device of a transmission type that modulates the G light according to an image signal. The s polarized light made incident on the spatial light modulator 107G is converted into p polarized light according to the modulation in the liquid crystal panel. The spatial light modulator 107G emits the G light converted into the p polarized light according to the modulation. In this way, the G light modulated by the spatial light modulator 107G is made incident on the cross dichroic prism 108.

The B light transmitted through the B-light transmitting dichroic mirror 105G is made incident on a spatial light modulator 107B through two relay lenses 106 and two reflection mirrors 105. The spatial light modulator 107B is a liquid crystal display device of a transmission type that modules the B light according to an image signal. The B light is caused to pass through the relay lens 106 because the optical path of the B light is longer than the optical paths of the R light and the G light. It is possible to guide the B light transmitted through the B-light transmitting dichroic mirror 105G directly to the spatial light modulator 107B by using the relay lens 106.

The s polarized light made incident on the spatial light modulator 107B is converted into p polarized light according to the modulation in the liquid crystal panel. The spatial light modulator 107B emits the B light converted into the p polarized light according to the modulation. In this way, the B light modulated by the spatial light modulator 107B is made incident on the cross dichroic prism 108 serving as the light combining optical system. The spatial light modulators 107R, 107G, and 107B may convert the p polarized light into the s polarized light in addition to converting the s polarized light into the p polarized light according to the modulation.

The cross dichroic prism 108 serving as the color combining optical system is constituted by arranging two dichroic films 108a and 108b to be orthogonal in an X shape. The dichroic film 108a reflects the B light and transmits the R light and the G light. The dichroic film 108b reflects the R light and transmits the B light and the G light. In this way, the cross dichroic prism 108 combines the R light, the G light, and the B light modulated by the spatial light modulators 107R, 107G, and 107B, respectively. The projection lens 20 projects the light combined by the cross dichroic prism 108 in a direction of a first mirror 30 (see FIG. 1).

Referring back to FIG. 1, the first mirror 30 is provided in a position opposed to the projection lens 20 and a second mirror 40. The first mirror 30 returns light from the projection lens 20 in a direction of the second mirror 40 according to reflection. The first mirror 30 has a substantially flat plane shape. It is possible to constitute the first mirror 30 by forming a reflective film on a parallel flat plate. As the reflective film, it is possible to use a layer of a high reflective member, for example, a layer of a metal member such as aluminum and a dielectric multi-layer film. A protective film having a transparent member may be formed on the reflective film.

The second mirror 40 is formed in a position opposed to the first mirror 30 on the rear surface of the housing 70. The second mirror 40 widens an angle of light from the first mirror 30 according to reflection. The second mirror 40 bends the light from the first mirror 30 at about 90 degrees and causes the light to travel in a direction of a third mirror 50. The second mirror 40 has a curved surface of an aspherical surface shape. It is possible to constitute the second mirror 40 by, for example, forming a reflective film on a board having a resin member or the like. Details of a structure of the second mirror 40 are the same as, for example, the details of the projection mirror described in Japanese Patent Application Laid-Open No. 2002-267823. The second mirror 40 is capable of simultaneously performing bending and angle-widening of light by adopting the curved surface shape. By widening an angle of light not only with the projection lens 20 but also with the second mirror 40, it is possible to form the projection lens 20 smaller than a projection lens formed when an angle of light is widened only by the projection lens 20. In other words, enlargement of an image and imaging on a surface to be irradiated are performed by the projection lens 20 and the second mirror 40. The projection lens 20 has a function for performing the enlargement of an image and the imaging on the surface to be irradiated. The second mirror 40 has a function for performing the enlargement of an image. Thus, the second mirror 40 can correct distortion of an image.

A projection optical system 90 includes the projection lens 20, the first mirror 30, and the second mirror 40 and projects light from the optical engine unit 10. The projection lens 20, the first mirror 30, and the second mirror 40 constituting the projection optical system 90 is integrally constituted by a support section 80. It is possible to simplify assembly of the projector 100 and adjustment of positions and the like of the-respective units and reduce manufacturing cost by integrally constituting the projection lens 20, the first mirror 30, and the second mirror 40. In the structure of the present invention, it is possible to divide lenses and mirrors in the projection optical system 90 without mixing the lenses and the mirrors.

Like a projection lens usually used, the projection lens 20 is formed by building respective lenses in a lens barrel while centering the lenses. It is possible to form the projection optical system 90 by fixing the projection lens 20, the first mirror 30, and the second mirror 40 to the support section 80 while making optical axes thereof identical. As described later, since the second mirror 40 is formed in a shape for widening an angle of light, it is relatively easy to make the optical axis of the second mirror 40 and the optical axis of the projection lens 20 identical. On the other hand, when lenses and mirrors are mixed, since the number of optical elements for making optical axes identical increases, it is extremely difficult to assemble a projection optical system. It is possible to simplify adjustment of positions and the like of the respective units and reduce manufacturing cost by separately arranging the lenses and the mirrors in the projection optical system 90. Moreover, the second mirror 40 may be formed by forming a part of the support section 80 in the shape of the second mirror 40 and applying a reflective film to the part of the support section 80.

The third mirror 50 is provided near the outer edge in the upper part of the screen 60 on the top surface of the housing 70. The third mirror 50 returns light from the projection optical system 90 in a direction of the screen 60 according to reflection. Like the first mirror 30, the third mirror 50 has a substantially flat plane shape. The projector 100 is constituted by arranging the third mirror 50 on an upper side and arranging the optical engine unit 10 on a lower side with respect to the center of the screen 60. The optical engine unit 10 is provided in a position right under the third mirror 50.

Light made incident on the first mirror 30 from the projection lens 20 and light made incident on the third mirror 50 from the second mirror 40 travel upward. This makes it possible to cause light to travel in a direction along the screen 60 in the housing 70 and reduce the thickness of the projector 100. The projection optical system 90 bends light at about 90 degrees in the first mirror 30 and the second mirror 40, respectively. The screen 60 is a transmission screen that displays a projected image on a surface on an appreciator side by transmitting light corresponding to an image signal. The screen 60 is provided on the front surface of the housing 70.

Figure 3:
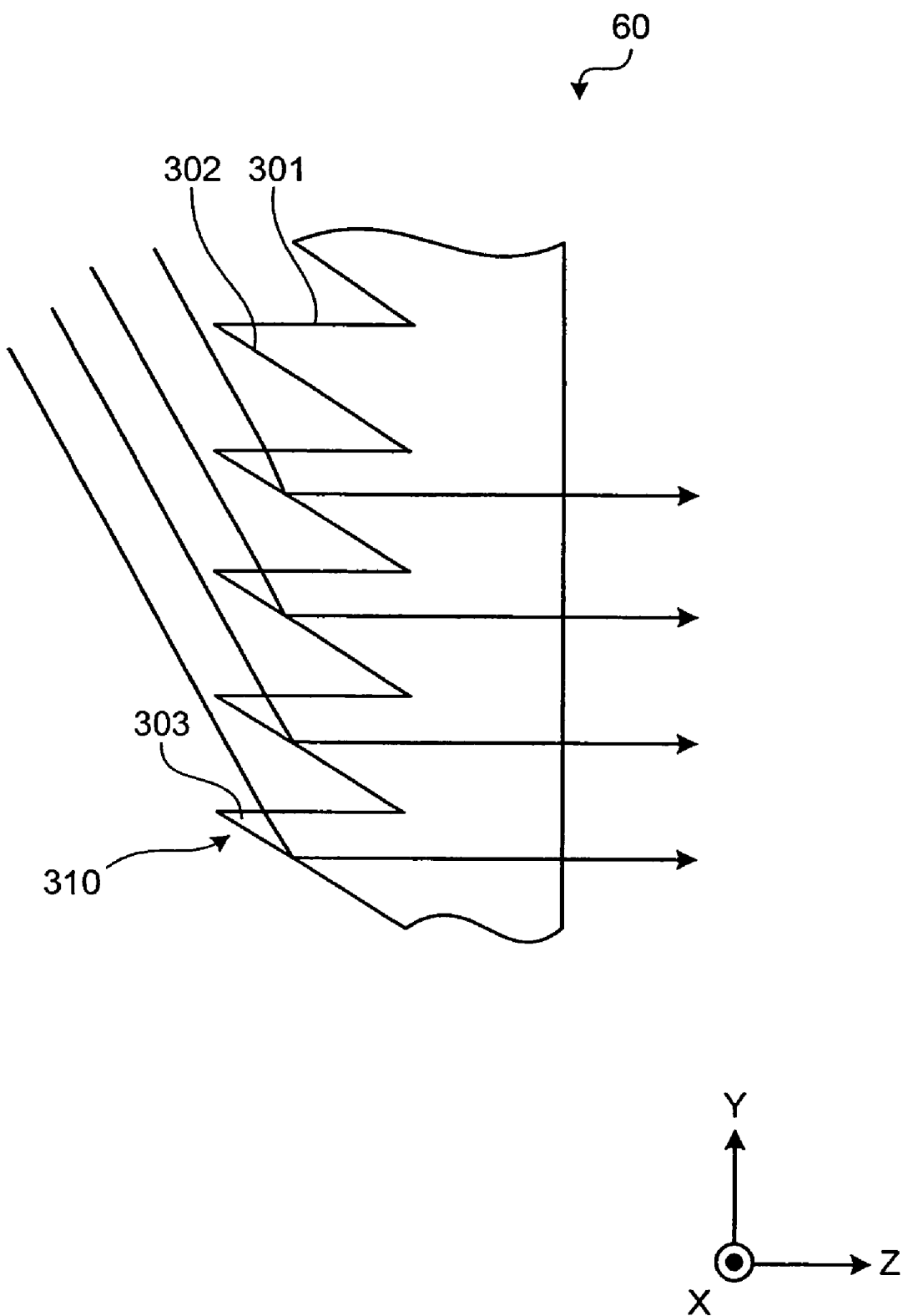
FIG. 3 is a diagram of a sectional structure of a main part of a screen.

FIG. 3 is a diagram of a sectional structure of a main part of the screen 60. The screen 60 has a Fresnel lens 310 provided on a side on which light corresponding to an image signal is made incident. The Fresnel lens 310 is an angle converting unit that converts an angle of light from the third mirror 50. The Fresnel lens 310 is constituted by arranging prism sections 303 of a shape obtained by cutting out a convex surface of a convex lens on a plane. As shown in a plane structure in FIG. 21, the prism sections 303 are arranged in a substantially concentric shape with an optical axis AX as the center.

Referring back to FIG. 3, the prism sections 303 has a substantially triangular shape formed by first surfaces 301 and second surfaces 302 on an YX section passing the center of the concentric circle. Light from the third mirror 50 is made incident on the first surfaces 301. The second surfaces 302 reflect light from the first surfaces 301. Light from the third mirror 50 is made incident on the prism sections 303 from the first surfaces 301. The light made incident on the prism sections 303 is totally reflected on the second surfaces 302 and, then, travels in a Z direction, which is the direction of the observer. The Fresnel lens 310 converts an angle of the light from the third mirror 50 in the direction of the observer in this way. Components other than the Fresnel lens 310, for example, a lenticular lens array or a microlens array that diffuses light from the Fresnel lens 310, a diffuser in which a diffusing material is dispersed, and the like may be provided in the screen 60.

FIG. 4 is a diagram of an external appearance of the projector 100 viewed from the front surface. As shown in FIG. 1, in the projector 100, a space on a side lower than the screen 60 in the housing 70 is unnecessary. Therefore, it is possible to reduce a size of a non-display section, which is a portion other than the screen 60. When it is possible to reduce the size of the non-display section, it is possible to improve designability and, in addition, it is possible to display a large image with the small housing 70.

Figure 5:
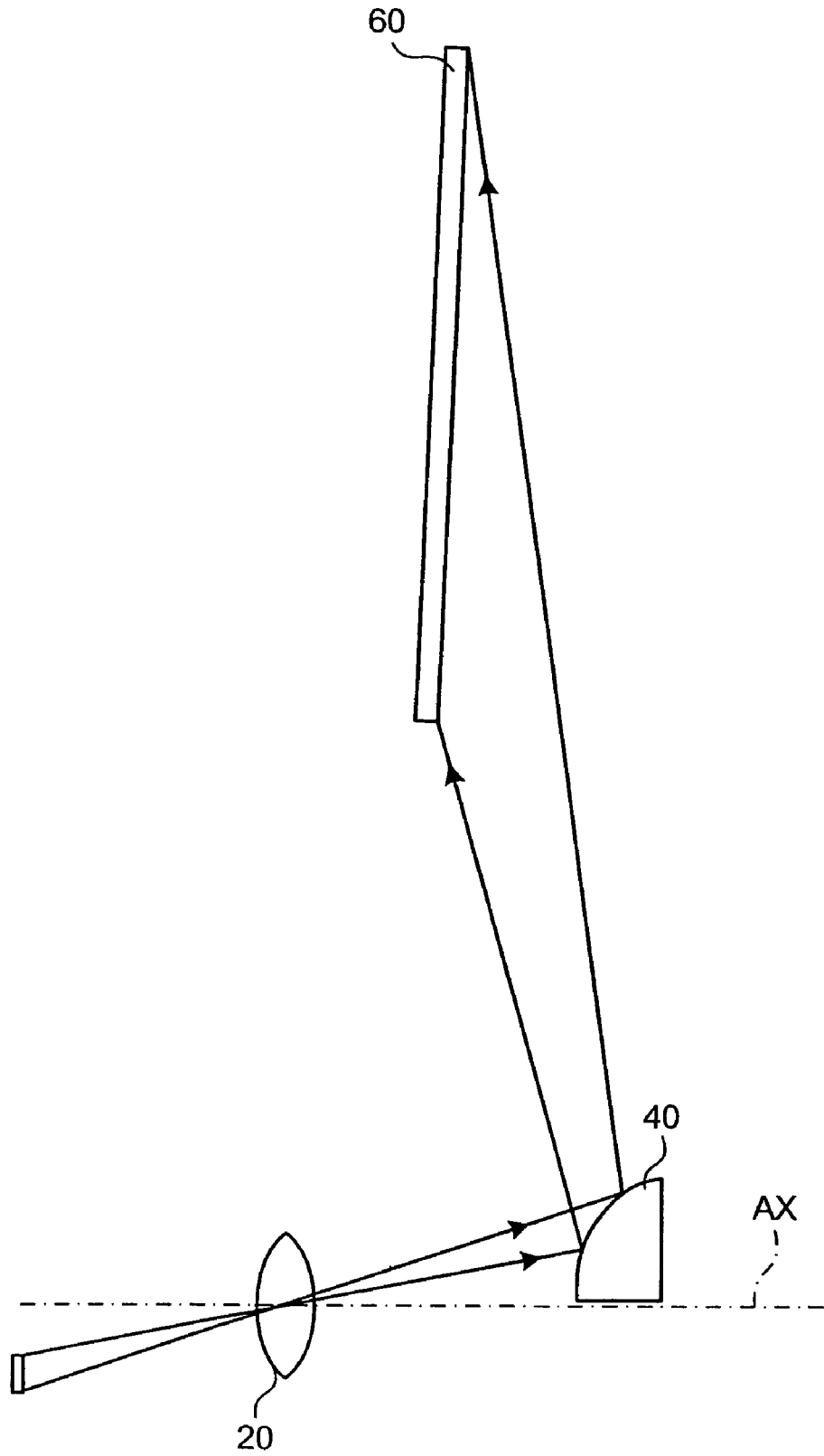
FIG. 5 is a diagram for explaining arrangement of respective units of the projector.

FIG. 5 is a diagram for explaining arrangement of the respective units of the projector 100. The projection lens 20, the second mirror 40, and the screen 60 form a so-called coaxial optical system in which all of the units are arranged such that the optical axis AX is substantially identical. Further, the projection lens 20, the second mirror 40, and the screen 60 form a so-called shift optical system that causes light from the optical engine unit 10 to travel while being shifted to a specific side from the optical axes AX. Specifically, the projection lens 20, the second mirror 40, and the screen 60 cause the light from the optical engine unit 10 to travel while being shifted to the upper side on the paper surface in FIG. 5 with respect to the optical axis AX. On the other hand, a center normal of an image surface imaginarily formed on an emission surface of the cross dichroic prism 108 in the optical engine unit 10 is parallel to the optical axis AX and shifted to the opposite side of the specific side, that is, the lower side on the paper surface in FIG. 5 with respect to the optical axis AX. In FIG. 5, to represent the optical axis AX in straight line shape, bending of optical paths in the first mirror 30 and the third mirror 50 is not shown in the figure. The optical engine unit 10 is not shown in the figure either.

It is possible to adopt the usual design method for an coaxial system by adopting the coaxial optical system. This makes it possible to reduce design manhours for an optical system and realize an optical system with less aberration. The second mirror 40 has a shape substantially rotationally symmetrical with the optical axis AX. It is possible to cause the optical axis of the second mirror 40 and optical axes of the other structures to substantially coincide with each other by forming the second mirror 40 in the shape substantially rotationally symmetrical with the optical axis AX. Since the second mirror 40 is formed in an axially symmetrical aspherical surface shape, it is possible to perform machining according to a simple method such as a lathe. This makes it possible to easily manufacture the second mirror 40 at high accuracy. It is possible to set traveling directions the same by adopting the shift optical system. In the projector 100, it is possible to adopt a thin structure and easily control traveling directions of light by projecting light in the same direction along the screen 60.

The third mirror 50 (see FIG. 1) returns light from the second mirror 40 in the downward direction in an optical path between the second mirror 40 and the screen 60. When the optical path in FIG. 5 is adopted as it is without providing the third mirror 50, it is necessary to arrange the respective units from the optical engine unit 10 to the second mirror 40 to be substantially separated from the screen 60. In the projector 100, it is possible to prevent the housing 70 from being increased in size in the vertical direction and prevent a large space from being secured in the lower side of the screen 60 in the housing 70.

The first mirror 30 (see FIG. 1) returns light from the projection lens 20 in the lateral direction in an optical path between the projection lens 20 and the second mirror 40. When the optical path shown in FIG. 5 is adopted as it is without providing the first mirror 30, it is necessary to arrange the optical engine unit 10 and the projection lens 20 to be substantially separated from the second mirror 40 to the observer side. By constituting the projector 100 to bend light from below in the lateral direction in the first mirror 30, it is possible to dislocate the optical engine unit 10 and the projection lens 20 to the lower part of the housing 70. Therefore, it is possible to prevent contact of the optical engine unit 10 and the like with the screen 60 and reduce the length in the thickness direction of the housing 70. In this way, it is possible to reduce a size of the housing 70 by bending the optical path with the first mirror 30 and the third mirror 50.

Figure 6:
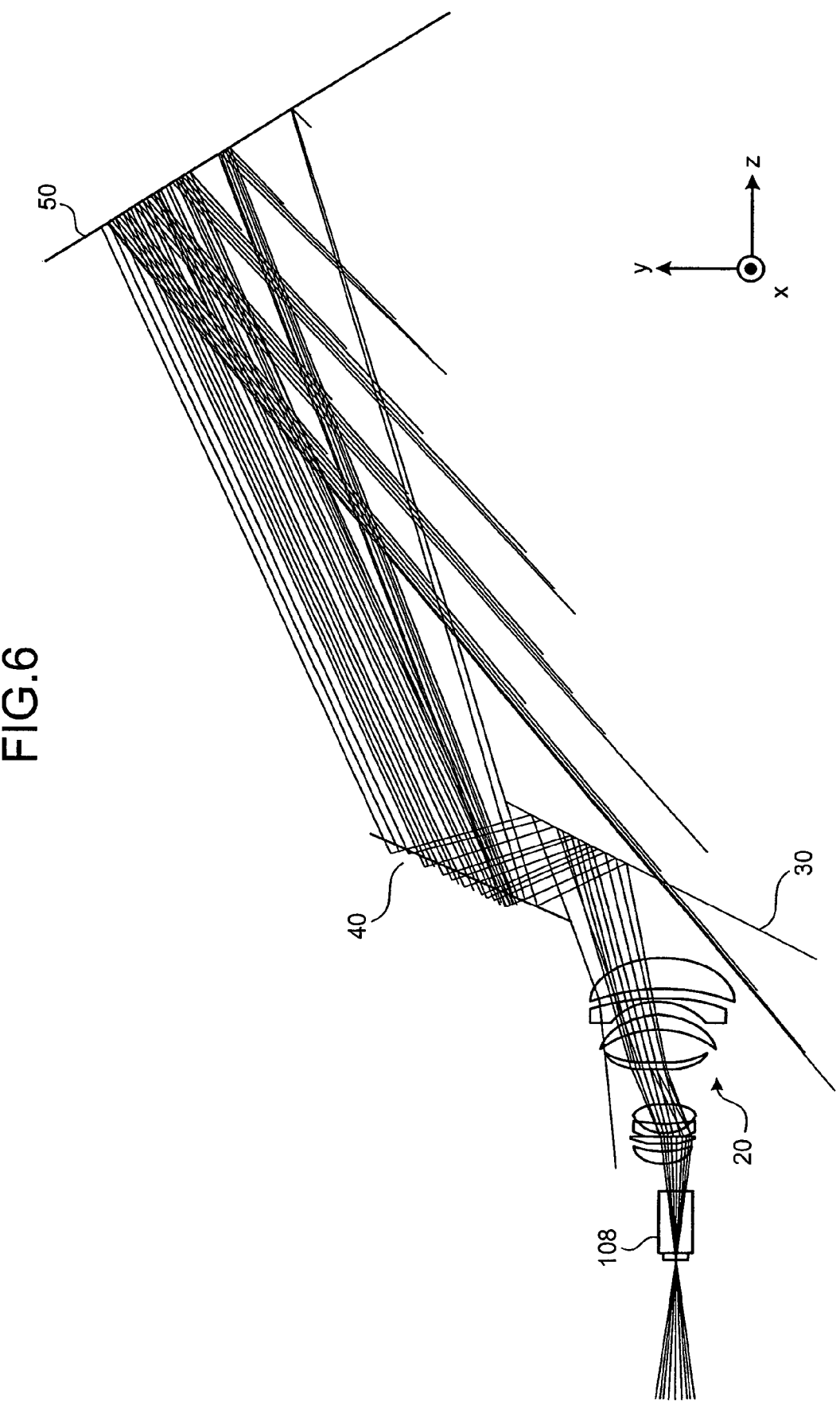
FIG. 6 is a diagram for explaining an optical path of light from a projection lens.
Figure 7:
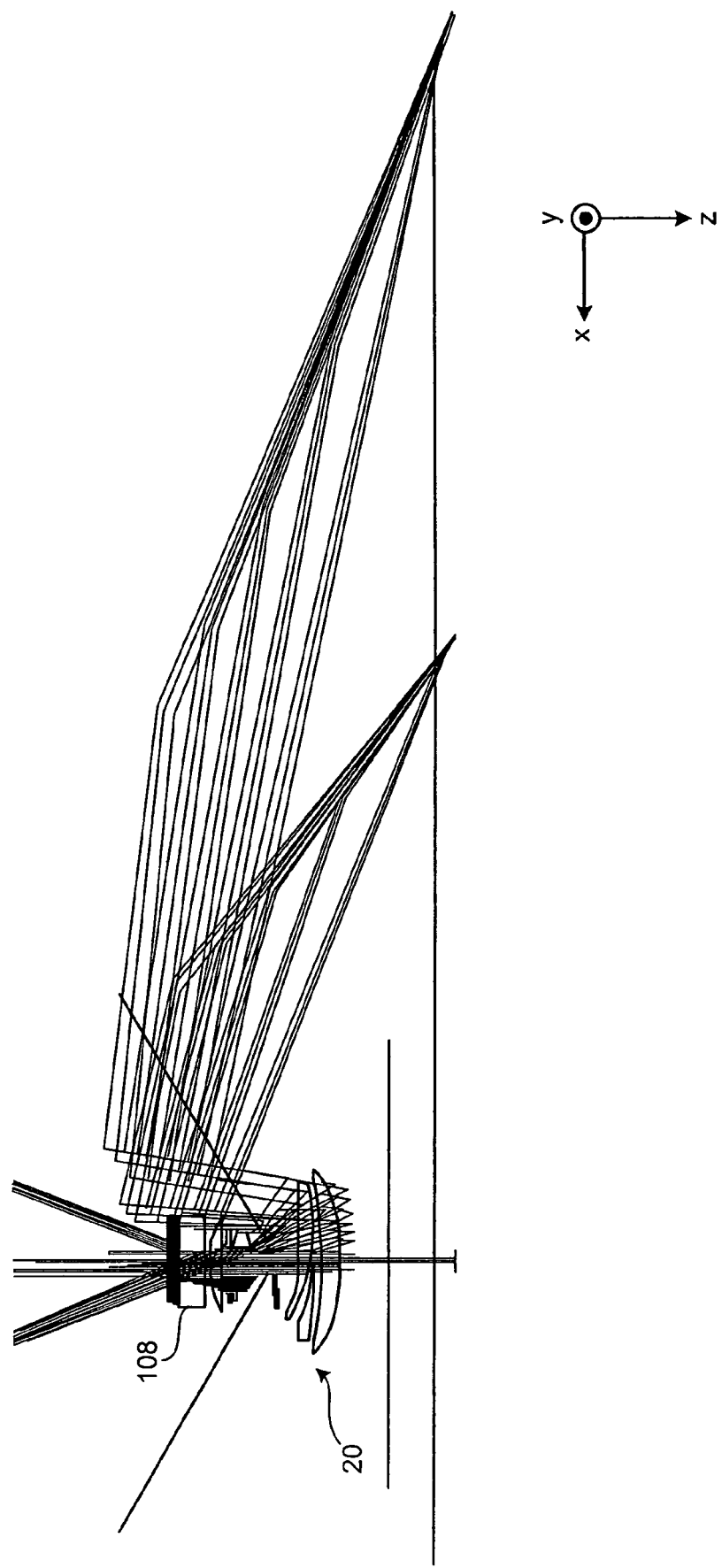
FIG. 7 is a diagram for explaining an optical path of light from the projection lens.
Figure 8:
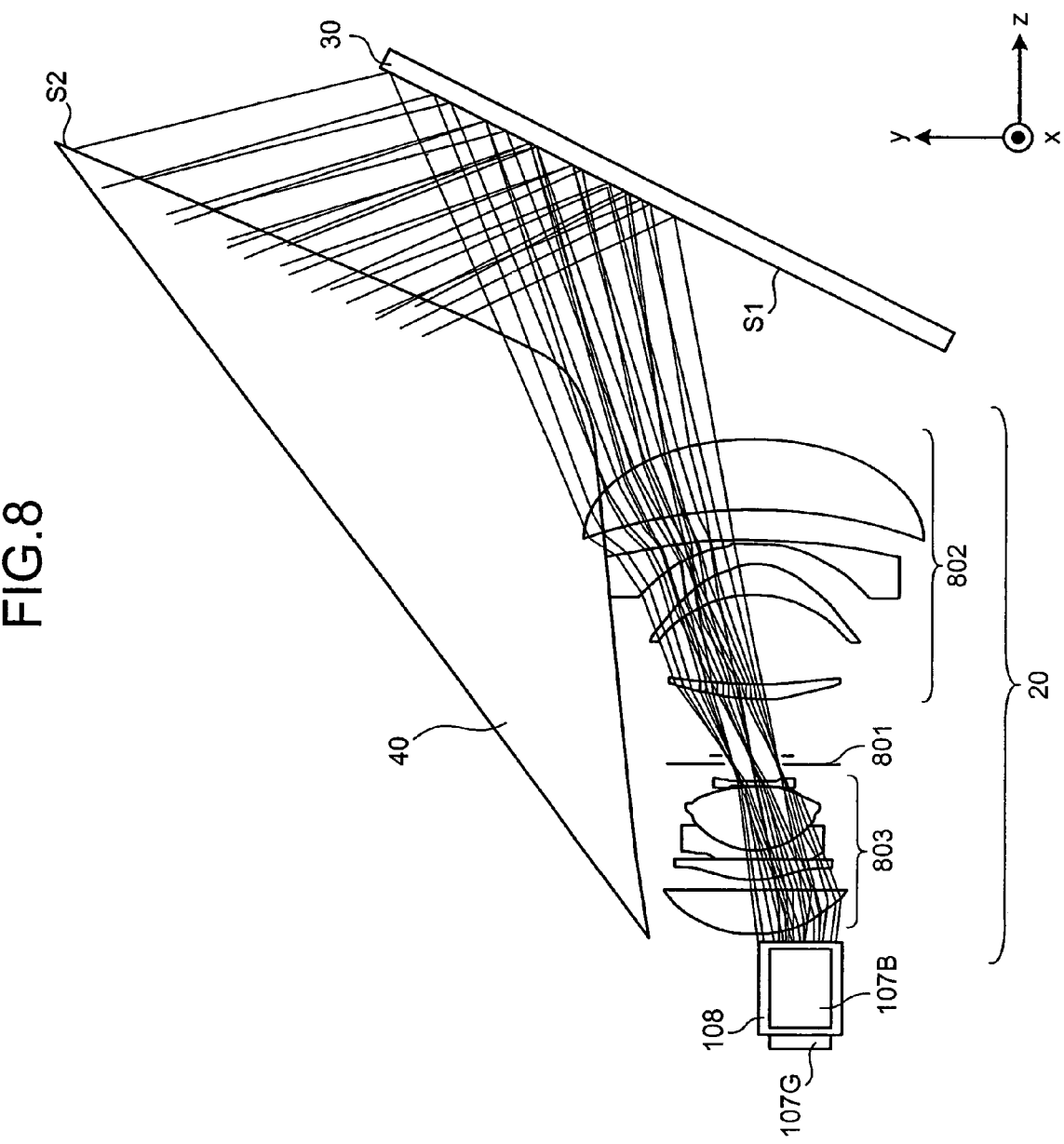
FIG. 8 is a diagram for explaining an optical path to a second mirror in detail.

FIGS. 6 and 7 are diagrams for explaining an optical path of light from the projection lens 20. FIG. 8 is a diagram for explaining in detail an optical path to the second mirror 40 in the optical path shown in FIG. 6. In FIGS. 6 to 8, coordinates are shown with an emission direction of the projection lens 20 set as a z direction. In FIGS. 6 and 8, optical paths on a yz plane are shown. In FIG. 7, an optical path of light traveling to a minus x side with the projection lens 20 as the center in the optical paths on an xz plane is shown. The yz plane and the xz plane correspond to the YZ plane and the XZ plane in the structure in FIG. 1, respectively. By adopting the shift optical system, light is made incident on only a part of the projection lens 20 as shown in FIG. 8. In this case, although high accuracy is required for a portion of the projection lens 20 on which light is made incident, high accuracy is not required for portions other than the portion on which light is made incident. Therefore, since it is unnecessary to manufacture portions of the projection lens 20 other than the portion on which light is made incident at high accuracy, it is easy to manufacture the projection lens 20. Since light is not made incident on the portions of the projection lens 20 other than the portion on which light is made incident, the projection lens 20 may be formed in a shape not having a lens function. Consequently, it is easier to manufacture the projection lens 20.

As shown in FIG. 8, the projection lens 20 has rear-group lenses 803 provided further on an incidence side than a stop 801 and front-group lenses 802 provided further on an emission side than the stop 801. The projection lens 20 is designed, for example, with an F number set as 2.5. The cross dichroic prism 108 of the optical engine unit 10 is arranged in a position shifted to a minus y side with respect to the projection lens 20. The spatial light modulators 107R, 107G, and 107B are provided in a position on which light traveling while being shifted to the minus y side, which is the specific side, from an optical axis is made incident. In FIG. 8, since the spatial light modulator 107R is provided in the inner part of the cross dichroic prism 108, the spatial light modulator 107R is not shown in the figure.

By shifting light in the minus y direction with respect to the optical axis on the incidence side of the projection lens 20, it is possible to shift the light to the plus y side with respect to the optical axis on the emission side of the projection lens 20 after being condensed by the stop 801. In this way, the light is caused to travel while being shifted to the specific side from the optical axis. The second mirror 40 has a shape obtained by rounding the tip of a conical shape. A portion 2 of the second mirror 40 on which light from the first mirror 30 is made incident is a part of an area other than the tip of the conical shape. The portion 2 has a shape similar to a straight line in the yz section shown in FIG. 8. In the first mirror 30 and the second mirror 40, the incidence plane S1 of the first mirror 30 and the portion S2 of the second mirror 40 on which the light from the first mirror 30 is made incident are formed in shapes of lines substantially parallel on the yz section. The yz section is a section that includes a normal of the screen 60 and is substantially orthogonal to the third mirror 50. The second mirror 40 has a function for widening an angle of light made incident thereon in the X direction and the Y direction. However, since light from the optical engine unit 10 is shifted with respect to the optical axis AX, the portion S2 of the second mirror 40 is used for the widening of an angle.

As explained with reference to FIG. 1, when the optical engine unit 10 is arranged right under the third mirror 50, it is possible to bend an optical path at about 90 degrees in the first mirror 30 and the second mirror 40, respectively. When the surface S1 and the surface S2 are formed in shapes of lines substantially parallel on the yz section, it is possible to bend the optical path at about 90 degrees in the first mirror 30 and the second mirror 40, respectively, in a state in which the first mirror 30 and the second mirror 40 are set closest to each other. Since traveling directions of light are set the same by adopting the shift optical system, it is also possible to accurately control the traveling directions of light with the first mirror 30 and the second mirror 40. It is possible to reduce the length in the thickness direction of the housing 70 and further reduce the thickness of the projector 100 by setting the first mirror 30 and the second mirror 40 close to each other.

When the optical path is bent at about 90 degrees in the first mirror 30 and the second mirror 40, respectively, there is also an advantage that it is possible to form an optical path long compared with the time when light is only caused to travel in a linear shape. It is seen that, whereas the second mirror 40 only returns the optical path in the plane shown in FIG. 6, the second mirror 40 substantially widens an angle of light in the x direction in the plane shown in FIG. 7. In this way, the second mirror 40 has a shape for widening an angle of light in the x direction.

Figure 9:
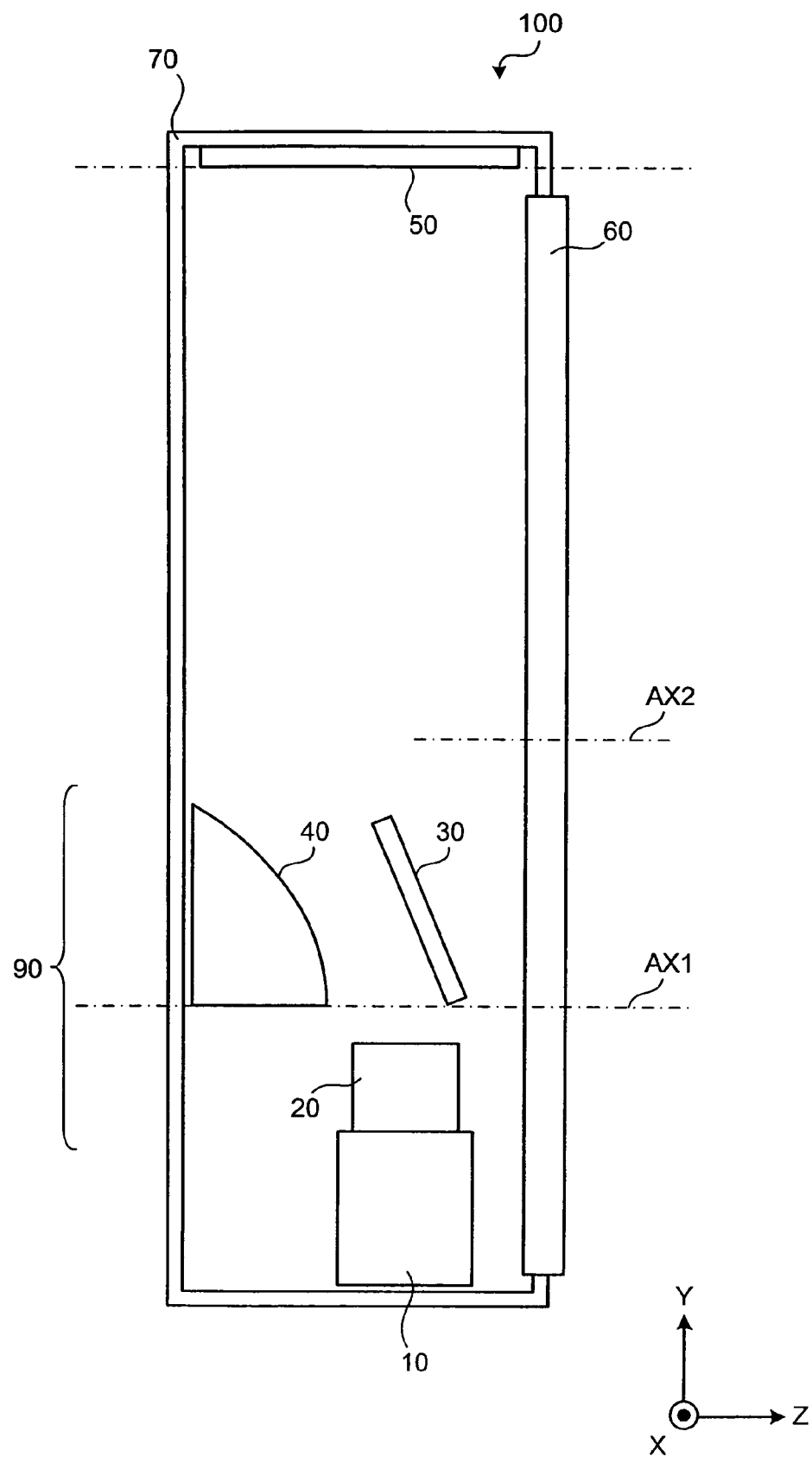
FIG. 9 is a diagram for explaining an overall structure of the projector.

FIG. 9 is a diagram for explaining an overall structure of the projector 100. It is assumed that the normal of the screen 60 coincides with an optical axis AX2 of the screen 60. When a gradient of the third mirror 50 with respect to the normal of the screen 60 is set as 0 degree, to form the screen 60 as a coaxial optical system, an optical axis AX1 of the second mirror 40 is set substantially parallel to the optical axis AX2 of the screen 60. The gradient of the third mirror 50 with respect to the normal of the screen 60 is 0 degree when the third mirror 50 is parallel to the XZ plane. As described later, when the gradient of the third mirror 50 is set to 0 to 10 degrees, the gradient of the optical axis AX1 of the second mirror 40 with respect to the optical axis AX2 of the screen 60 is also in a range from 0 to 10 degrees. When the first mirror 30 is not arranged, it is necessary to arrange the optical engine unit 10 and the projection lens 20 on the normal of the screen 60 or on a line having an angle equal to or smaller than 10 degrees with respect to the normal. It is extremely difficult to reduce the thickness of the projector 100. Thus, it can be said that the first mirror 30 is indispensable in the optical system of the projector 100 of the present invention.

Figure 10:
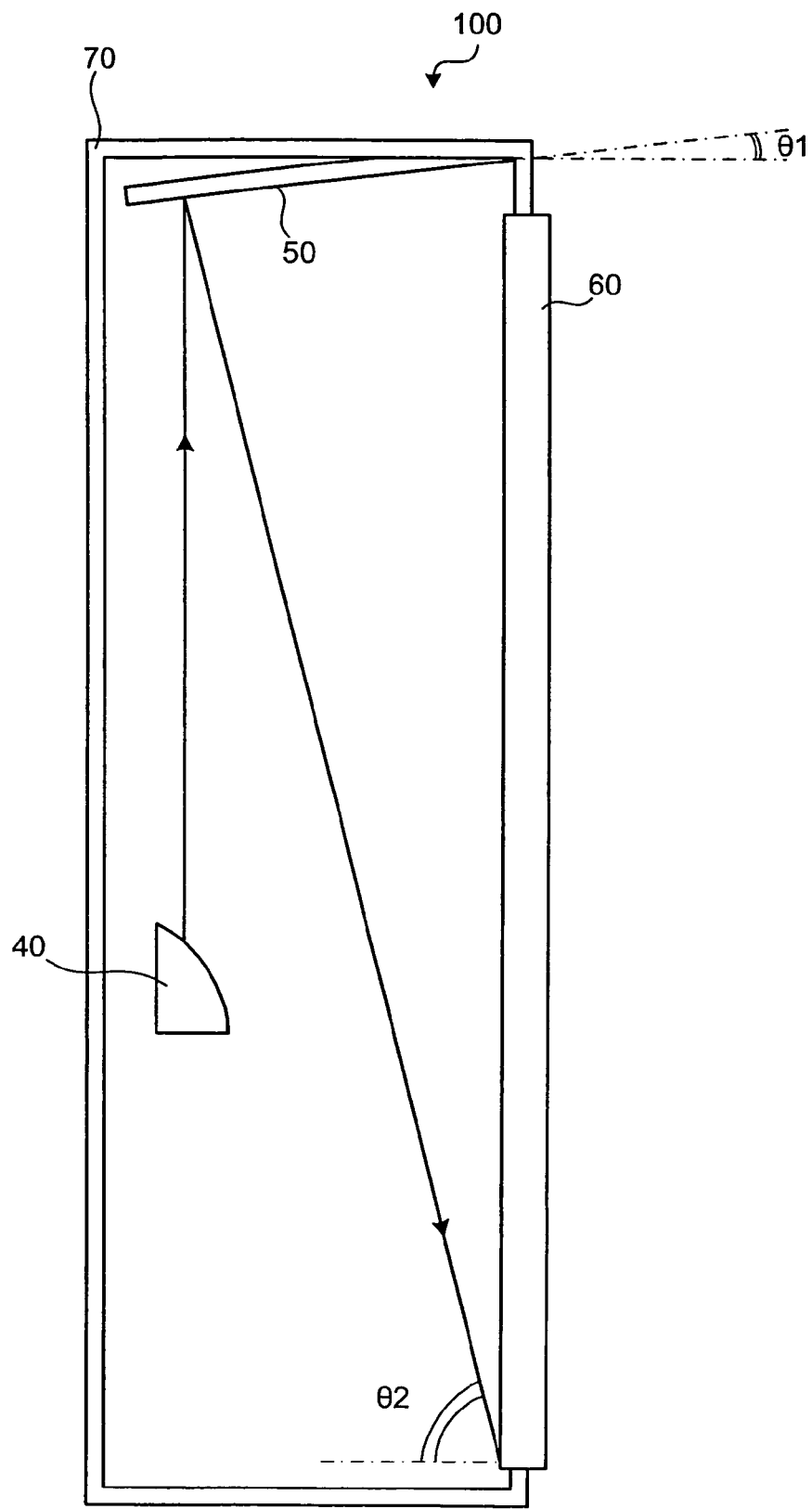
FIG. 10 is a diagram for explaining arrangement of the respective units for reducing the thickness of the projector.

FIG. 10 is a diagram for explaining arrangement of the respective units for reducing the thickness of the projector 100. To convert an angle of light in the direction of the observer with the Fresnel lens 310 (see FIG. 3), an angle of incidence θ2 of light with respect to the screen 60 is set to 80 degrees at the maximum. The angle of incidence θ2 on the screen 60 means an angle of an incident ray with respect to the normal of the screen 60. Light having the angle of incidence θ2 of 80 degrees is made incident on the end on the plus X side and the end on the minus X side in the lowermost part of the screen 60. Light having the angle of incidence θ2 of 80 degrees is present on the outermost side on the opposite side of the screen 60 in a light beam when the light is made incident on the third mirror 50. When such outermost light is made incident on the third mirror 50 from the second mirror 40, it is possible to reduce the thickness of the projector 100 most if the light is substantially parallel to the screen 60 or inclines to the screen 60 side. In this case, it is possible to determine the thickness of the projector 100 according to only a size of the third mirror 50.

When the angle of incidence θ2 of light with respect to the screen 60 is set to 80 degrees at the maximum, it is desirable to set an angle θ1 of the third mirror 50 with respect to the normal of the screen 60 to be equal to or larger than 0 degree and equal to or smaller than 10 degrees. Taking into account a member or the like for attaching the second mirror 40 to the housing 70, it is desirable to set the angle θ1 of the third mirror 50 with respect to the normal of the screen 60 to be equal to or larger than 5 degrees. Thus, it is desirable to set the angle θ1 of the third mirror 50 in the projector 100 to be equal to or larger than 5 degrees and equal to or smaller than 10 degrees.

When it is possible to set the angle of incidence θ2 in the lower part of the screen 60 large, as shown in FIG. 1, it is possible to arrange the optical engine unit 10 near the screen 60. The optical engine unit 10 is arranged near the screen 60 in a position other than a position where light is made incident on the screen 60 from the third mirror 50. It is possible to reduce the thickness of the housing 70 by arranging the optical engine unit 10 close to the screen 60. Consequently, in the thin structure, it is possible to prevent the light made incident on the screen 60 from being blocked by the optical engine unit 10. It is possible to reduce a size of the non-display section adjacent to the screen 60 by arranging the optical engine unit 10 on the back of the screen 60. In the present invention, it is possible to increase the angle of incidence θ2 in the lower part of the screen 60 by adopting the shift optical system. Therefore, it is possible to effectively utilize a space in the housing 70 by arranging the optical engine unit 10 in the lower part of the housing.

Figure 11:
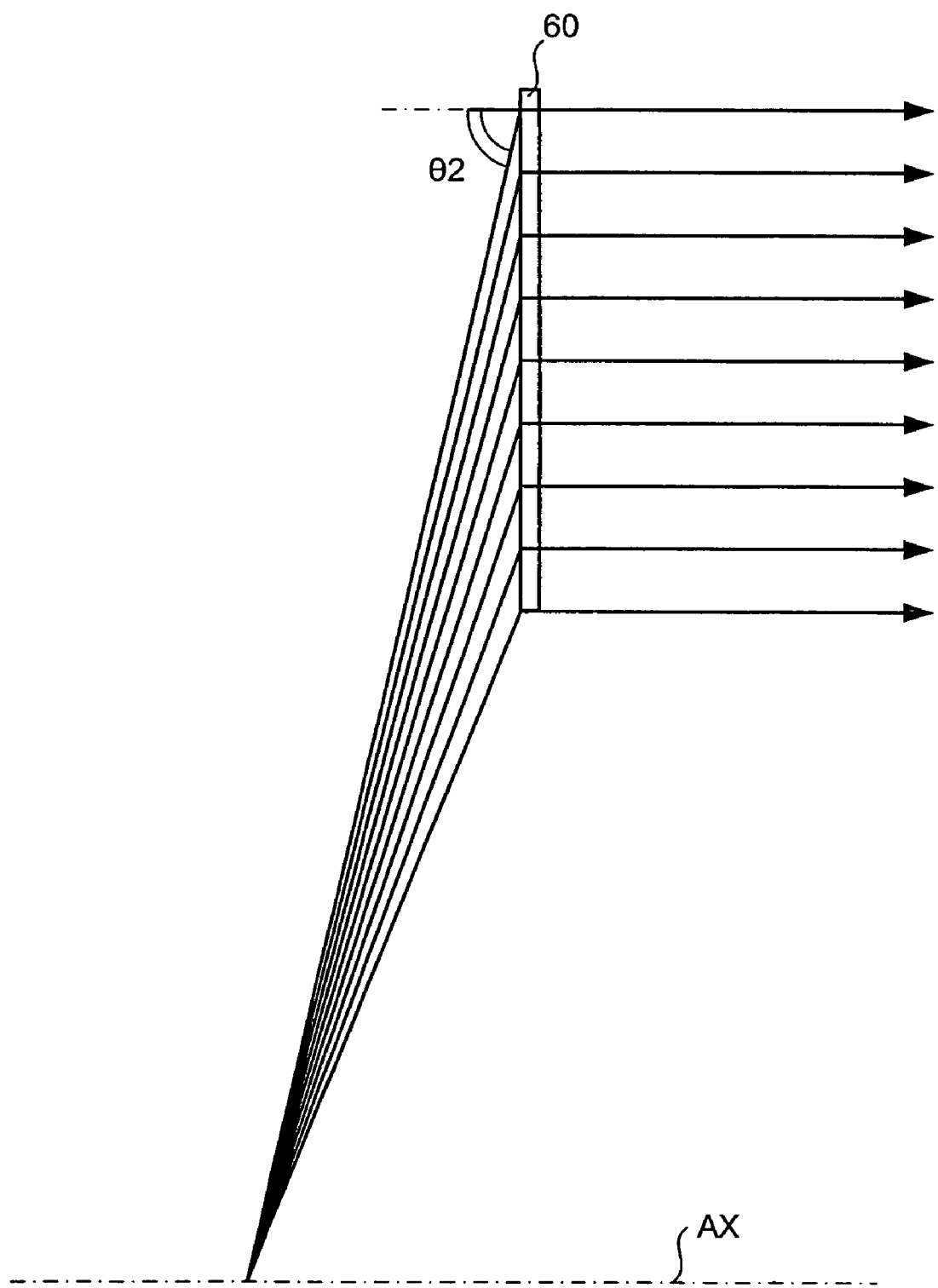
FIG. 11 is a diagram for explaining an optical path of light made incident on a screen.

FIG. 11 is a diagram for explaining an optical path of light made incident on the screen 60. In the explanation, it is assumed that light is emitted from one point on the optical axis AX. Reflection of light in the first mirror 30, the second mirror 40, and the third mirror 50 is not shown in the figure. Since the projector 100 adopts the shift optical system, it is possible to make the angle of incidence θ2 of the light with respect to the screen 60 uniform. For example, it is possible to set the angle of incidence θ2 to be equal to or larger than 70 degrees and equal to or smaller than 80 degrees. In the Fresnel lens 310 (see FIG. 3) provided in the screen 60, gradients of the first surfaces 301 and the second surfaces 302 of the respective prism sections are made uniform, respectively. This makes it possible to efficiently cause light emitted in the same traveling direction to travel in the direction of the observer. Since it is possible to form the respective prism sections 303 using the same cutter to have substantially identical sectional shapes, it is possible to easily machine the screen 60 and reduce manufacturing cost.

Figure 21:
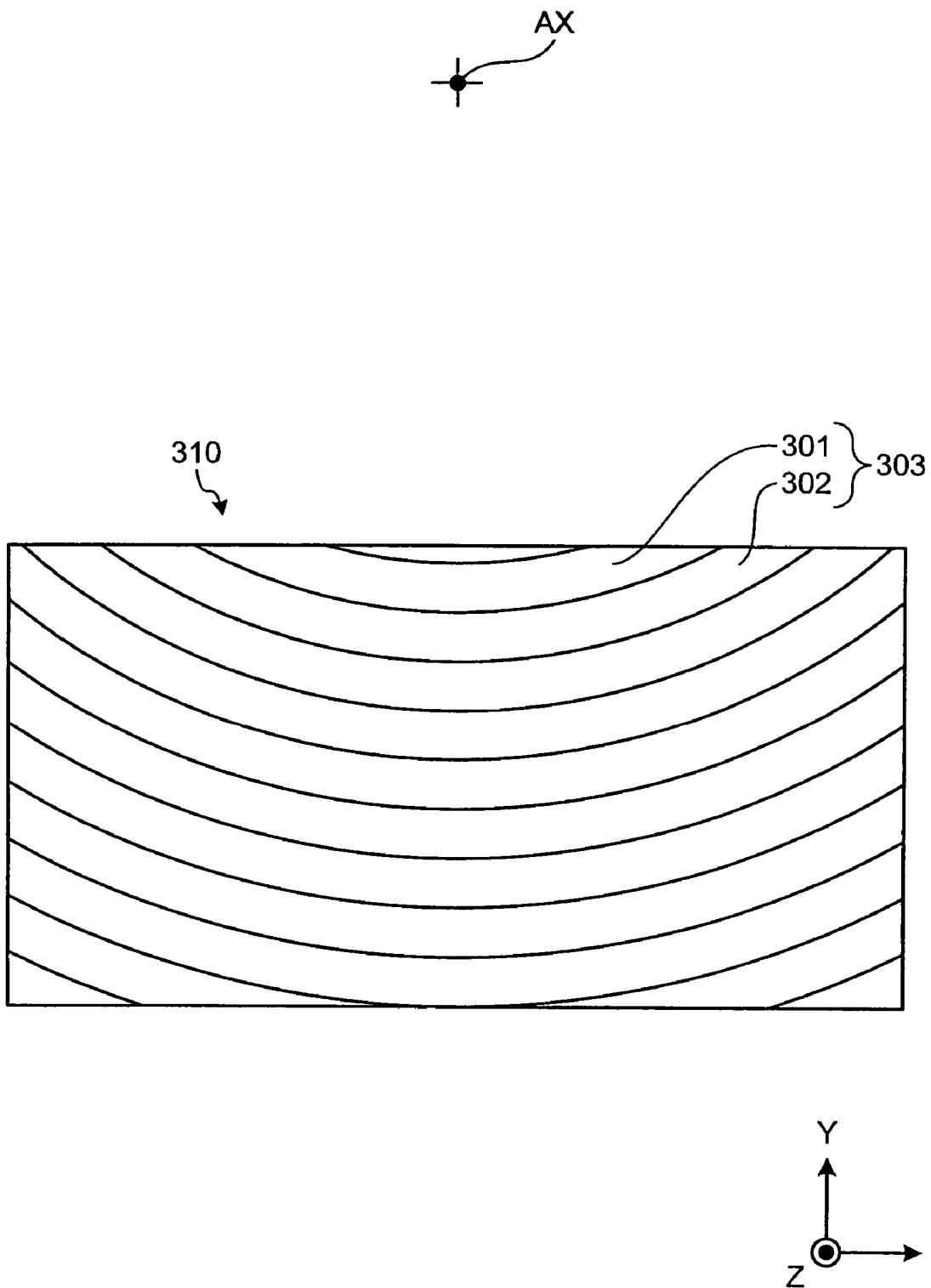
FIG. 21 is a diagram of a plane structure of a Fresnel lens.

In the structure of the present invention for making the light emitted in the same traveling direction incident on the screen 60, the optical axis AX forming the center of a concentric circle in which the prism sections 303 are arranged is located on the outside of the screen 60 (see FIG. 21). By arranging the prism sections 303 in a concentric shape with the optical axis AX as the center, it is possible to accurately convert an angle of the light made incident on the screen 60 in the direction of the observer and display an image that is bright and has uniform brightness.

Figure 12:
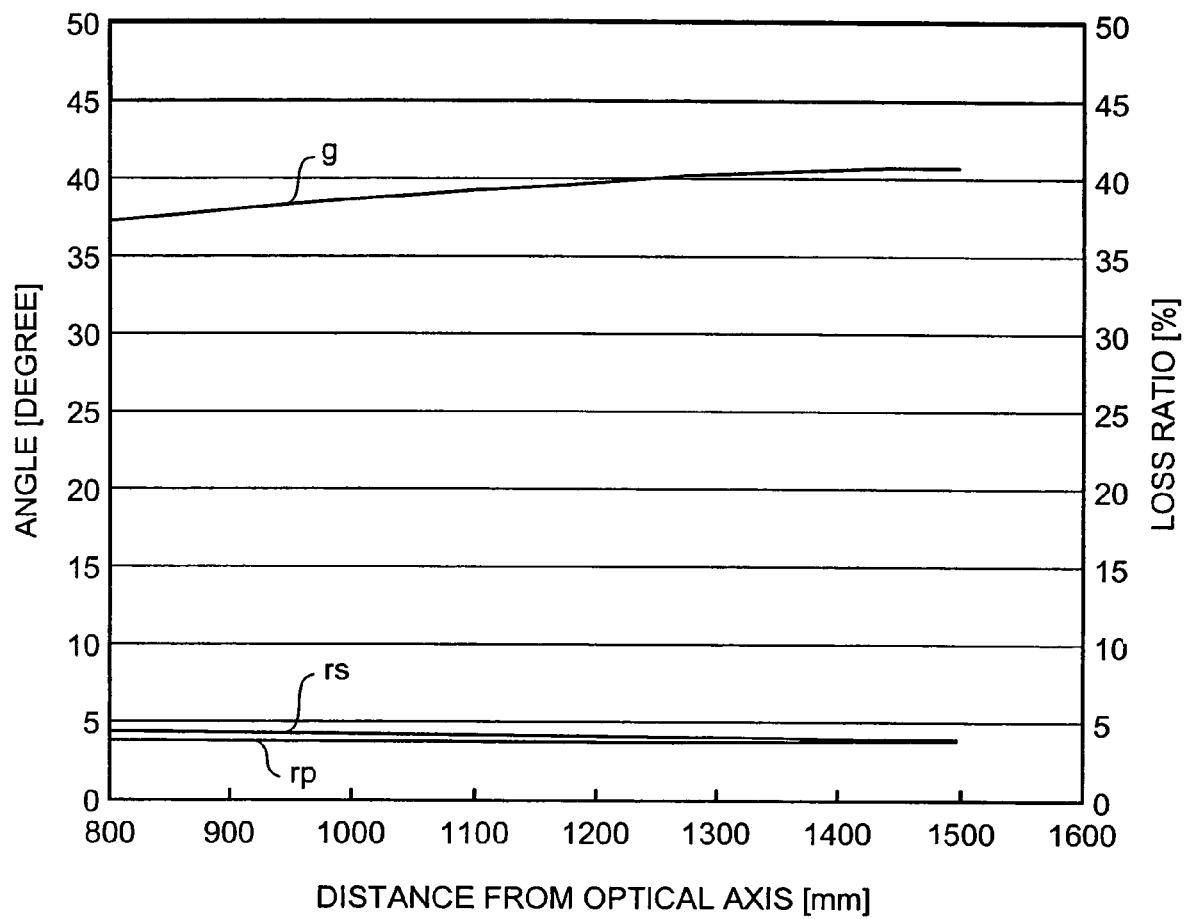
FIG. 12 is a graph of a gradient of second surfaces and loss ratios of light on the second surfaces.

FIG. 12 is a graph of a gradient g of the second surface 302 of the respective prism sections 303 and loss ratios rp and rs of light on the second surfaces 302 due to reflection. The gradient g of the second surfaces 302 is represented by an angle of the second surfaces 302 with respect to the normal of the screen 60. The loss ratio rp represents a loss ratio of the p polarized light and the loss ratio rs represents a loss ratio of the s polarized light. For example, the screen 60 is provided in a position at a distance of 850 millimeters to 1480 millimeters from the optical axis AX. It is possible to set the gradient g of the second surfaces 302 uniformly to 37 degrees to 41 degrees at the distance of 850 millimeters to 1480 millimeters from the optical axis AX. The loss ratios rp and rs are substantially fixed at about 4% at the distance of 850 millimeters to 1480 millimeters from the optical axis AX. This makes it possible to reflect light at the same efficiency and in the same direction regardless of a position on the screen 60 and reduce a difference of appearance of an image in each position on the screen 60.

Figure 13:
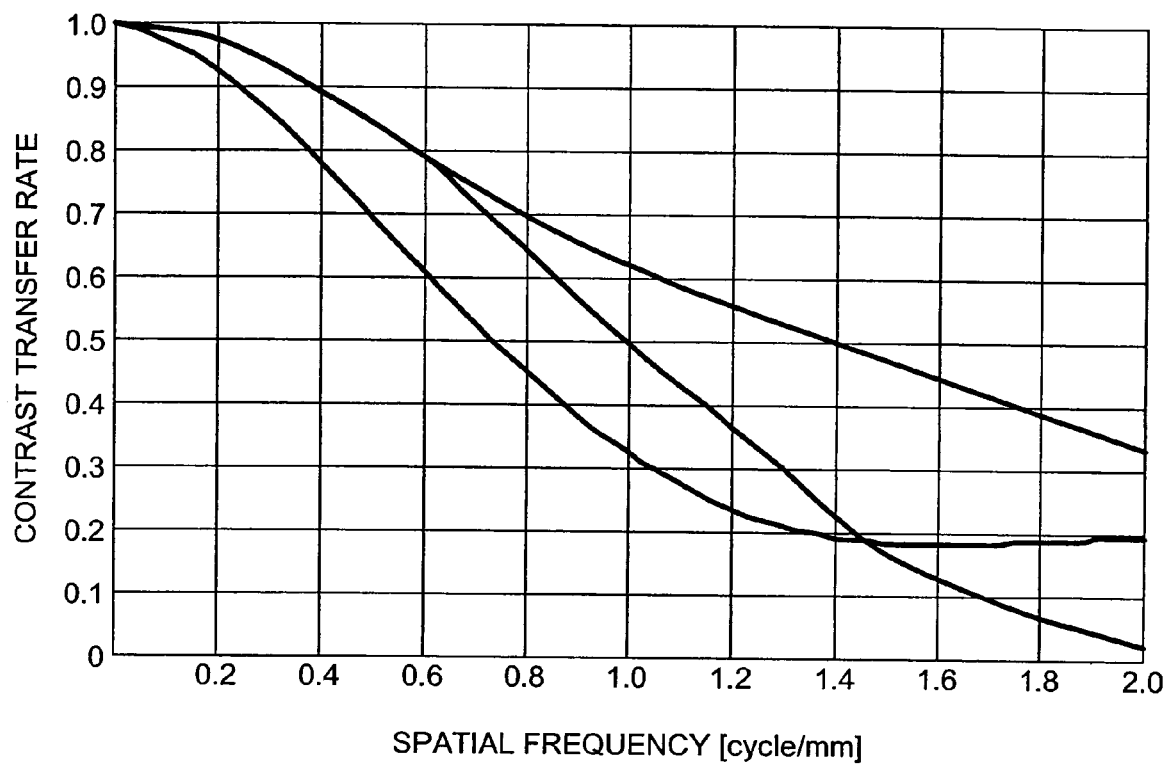
FIG. 13 is a graph for explaining performance of the projector.
Figure 14:
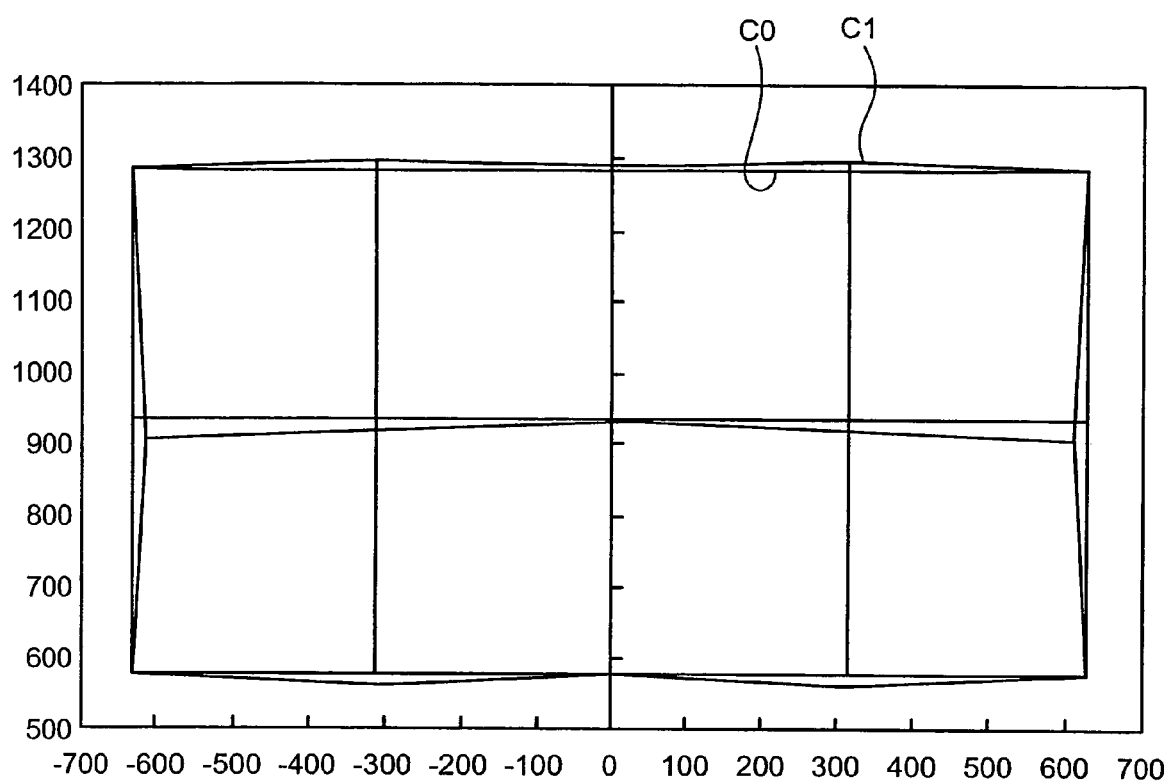
FIG. 14 is a graph for explaining performance of the projector.

FIGS. 13 and 14 are graphs for explaining performance of the projector 100. The graph shown in FIG. 13 is a magnitude transfer function (MTF) represented for a plurality of lights made incident on different positions on the screen 60. An abscissa of the graph shown in FIG. 13 indicates a spatial frequency and an ordinate indicates a transfer rate of a contrast. It is assumed that the projector 100 displays images with 82-times magnification from the spatial light modulators 107R, 107G, and 107B to the screen 60. In this case, a spatial frequency of 50 cycle/mm in the spatial light modulators 107R, 107G, and 107B can be converted to 0.6 cycle/mm. In the projector 100, a contrast transfer rate equal to or higher than 0.6 is attained at the spatial frequency of 0.6 cycle/mm. It is seen that it is possible to transfer a contrast at a high probability.

The graph shown in FIG. 14 is a graph for explaining distortion of an image on the screen 60. Distortion of a displayed image C1 with respect to an original image C0 is shown with 30-times magnification. The projector 100 of the present invention is capable of reducing the distortion of the displayed image C1 with respect to the original image C0 to 0.1% or less. This makes it possible to display a high-quality image with the projector 100. Consequently, the projector 100 of the present invention can be constituted thin and with a small non-display section. There is an effect that it is possible to accurately cause light to travel and display an image.

In the projector 100 according to this embodiment, the components in the housing 70 may be arranged reversely in the vertical direction. In this case, the optical engine unit 10 is arranged near the top surface of the housing 70 and the third mirror 30 is arranged on the bottom surface of the housing 70. In the projector 100 according to this embodiment, the components in the housing 70 may be arranged to be turned at about 90 degrees to the right or the left.

Figure 15:
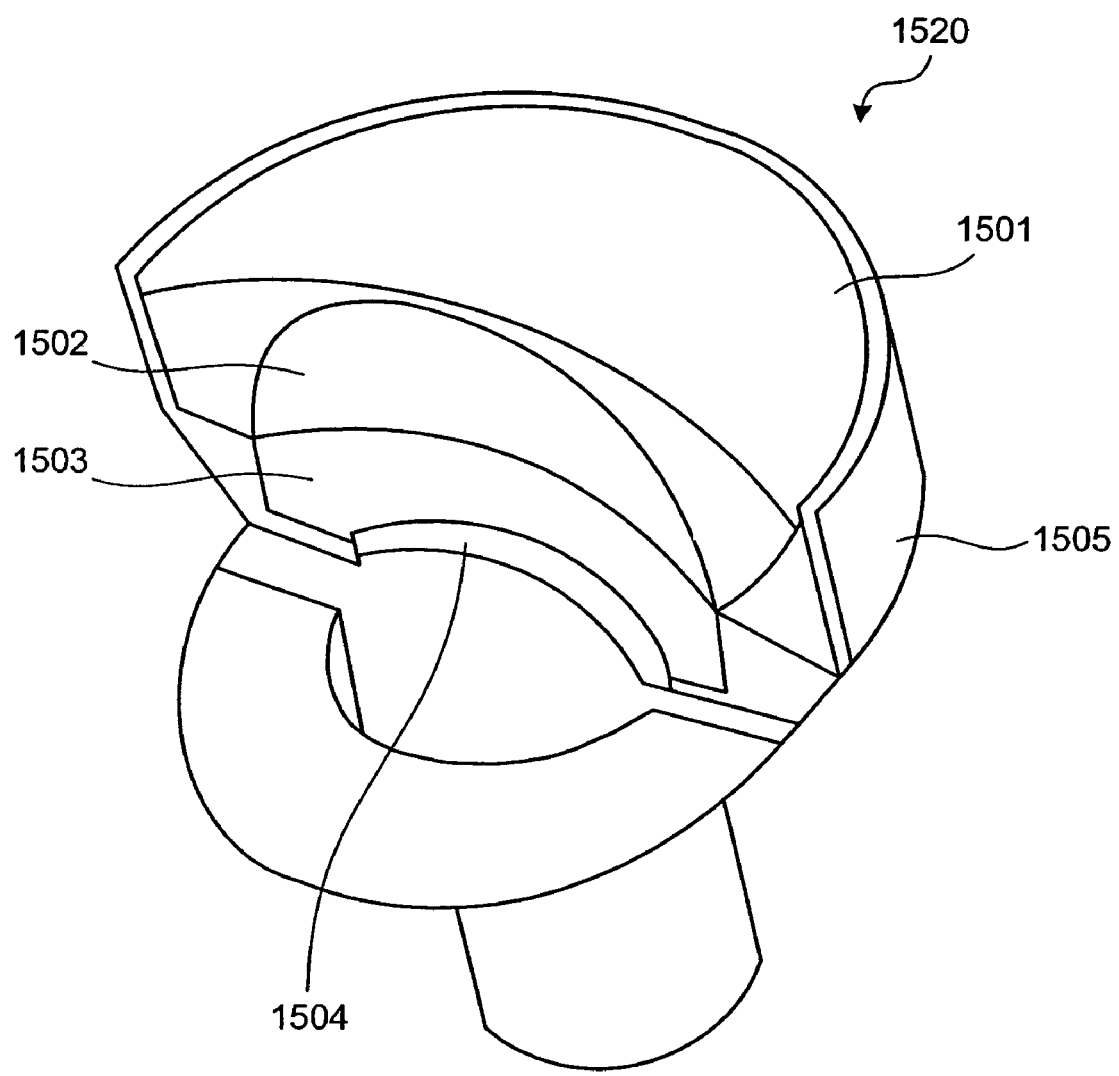
FIG. 15 is a diagram of a perspective structure of a projection lens in a second embodiment of the present invention.

FIG. 15 is a diagram of a perspective structure of a projection lens 1520 used for a projector that is an image display apparatus according to a second embodiment of the present invention. The projection lens 1520 is characterized in that front-group lenses 1501, 1502, 1503, and 1504 are formed in a substantially semicircular shape. The repetition of the explanations in the first embodiment is omitted.

Figure 16:
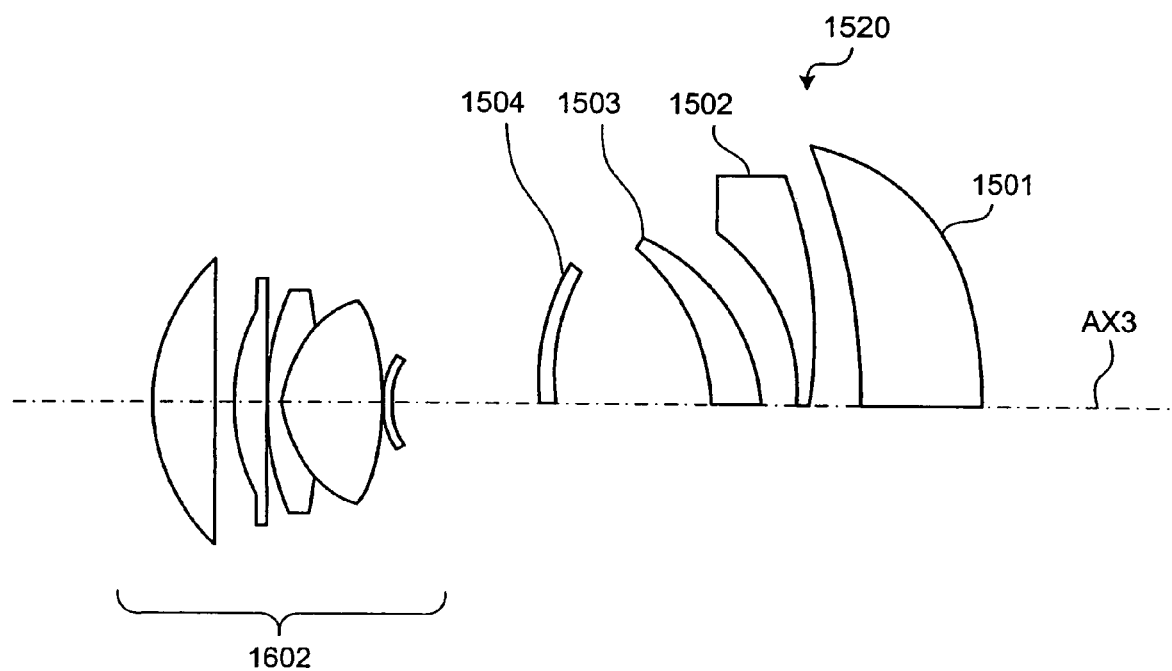
FIG. 16 is a diagram of a sectional structure of the projection lens.

FIG. 16 is a diagram of a sectional structure of the projection lens 1520. Rear-group lenses 1602 in the projection lens 1520 is constituted the same as the rear-group lenses 803 (see FIG. 8) of the projection lens 20 used for the projection optical system 90 according to the first embodiment. The front-group lenses 1501 to 1504 have a structure obtained by cutting and removing substantially a half of the front-group lenses 802 according to the first embodiment with a plane including an optical axis AX3 of the projection lens 20.

Figure 17:
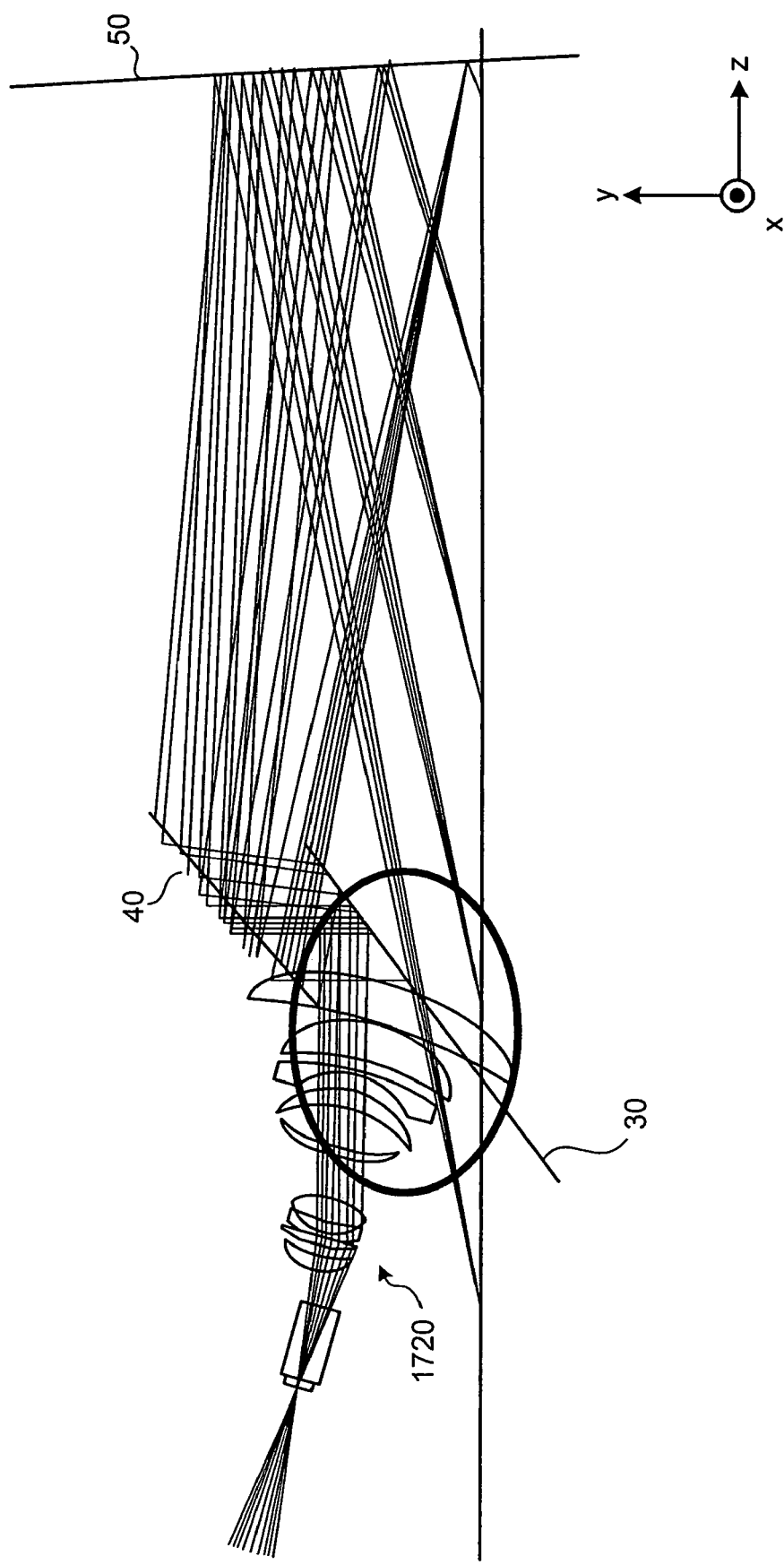
FIG. 17 is a diagram for explaining an advantage of the projection lens.

FIG. 17 is a diagram for explaining an advantage of the projection lens 1520. For example, when a usual projection lens 1720 in which front-group lenses are formed by circular lenses is used, as indicated by a bold line circle, light traveling from the third mirror 50 to the screen 60 may come into contact with a part of the front-group lenses. In the present invention, since the shift optical system is adopted, it is possible to remove a part of the circular lenses other than a portion where light from the optical engine unit 10 passes, for example, substantially a half of a circular shape. It is possible to prevent light made incident on the screen 60 from being blocked by the projection lens 1520 by removing the portion with which the light traveling from the third mirror 50 to the screen 60 comes into contact among the front-group lenses 1501 to 1504. It is possible to reduce a size of the projection lens 1520 and reduce a size of the projector by using the front-group lenses 1501 to 1504 of a substantially semicircular shape.

It is possible to easily form the projection lens 1520 by storing lenses of a substantially semicircular shape in a lens barrel 1505 (see FIG. 15) and, then, cutting four lenses together with the lens barrel 1505. It is possible to form two lenses of the front-group lenses 1501 to 1504 of the substantially semicircular shape at a time by dividing the usual circular lens into two. Consequently, it is also possible to reduce manufacturing cost. It is also possible to increase sizes of the front-group lenses 1510 to 1504 and shift the projection lens 1520 in the direction of the first mirror 30 by removing the portion with which the light traveling from the third mirror 50 to the screen 60 comes into contact. It is possible to improve accuracy of the projection lens 1520 and easily reduce aberration by reducing the length of an optical path from the projection lens 1520 to the screen 60.

Figure 18:
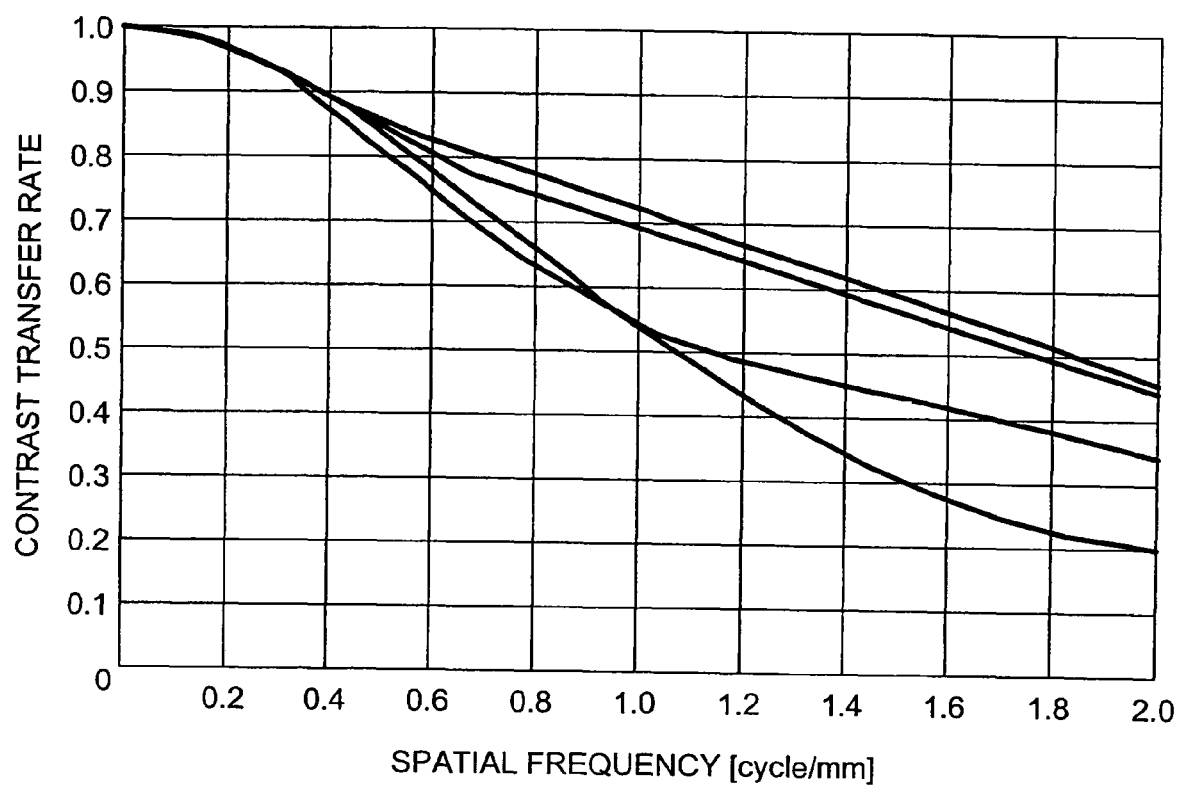
FIG. 18 is a graph for explaining performance of a projector.

FIG. 18 is a graph of a magnitude transfer function (MTF) in the projector according to this embodiment. In the projector according to this embodiment, a contrast transfer rate equal to or higher than 0 m 75 is attained at a spatial frequency of 0.6 cycle/mm. It is seen that it is possible to transfer a contrast at higher probability.

Figure 19:
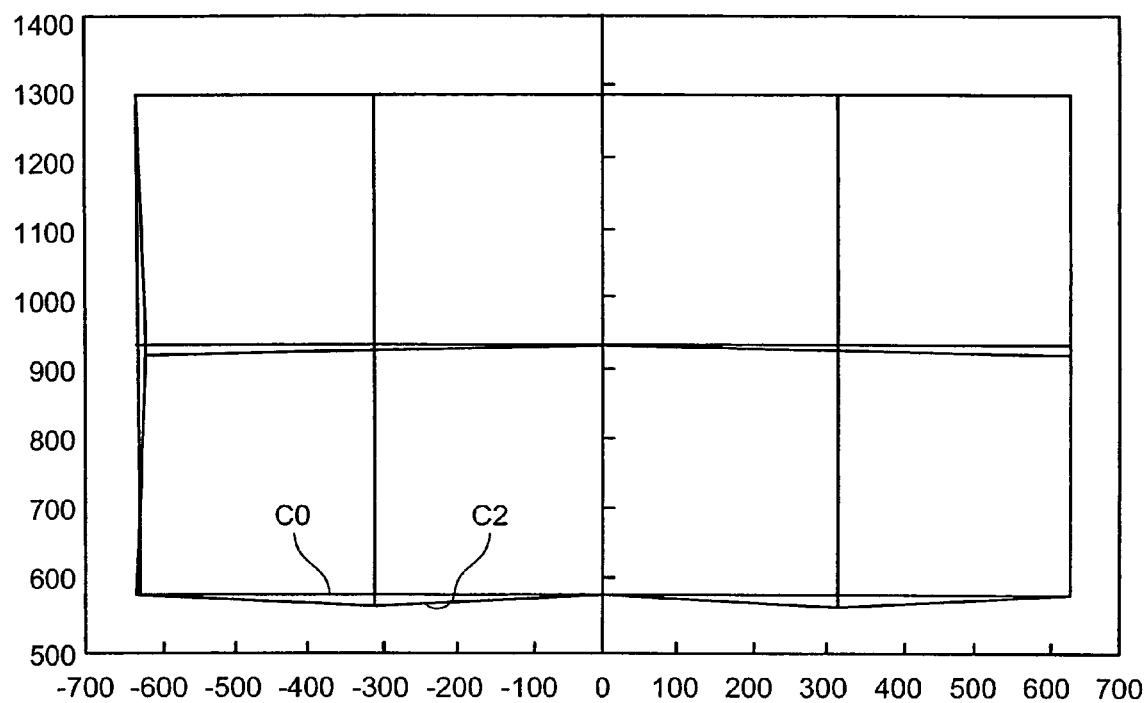
FIG. 19 is a graph for explaining performance of the projector.

FIG. 19 is a graph of distortion of an image on a screen of the projector according to this embodiment. Distortion of a displayed image C2 with respect to an original image C0 is shown with 30-times magnification. The projector of the present invention is capable of reducing the distortion of the displayed image C2 with respect to the original image C0 to 0.1% or less. It is seen that the distortion is further reduced from that shown in FIG. 14. According to this embodiment, it is possible to realize performance sufficiently applicable to Hi-Vision specifications of the next generation exceeding the specifications of the present projection television.

In this embodiment, all of the front-group lenses 1501 to 1504 are formed in the substantially semicircular shape. However, a shape of the front-group lenses 1501 to 1504 is not limited to this. At least one of the front-group lenses 1501 to 1504 only has to be formed in a shape obtained by cutting and removing a part of the substantially circular shape. For example, only a lens closest to an emission side among the front-group lenses may be formed in the substantially semicircular shape. Besides the substantially semicircular shape, a shape of the lenses may be, for example, a shape obtained by cutting and removing one third of the substantially circular shape.

Figure 20:
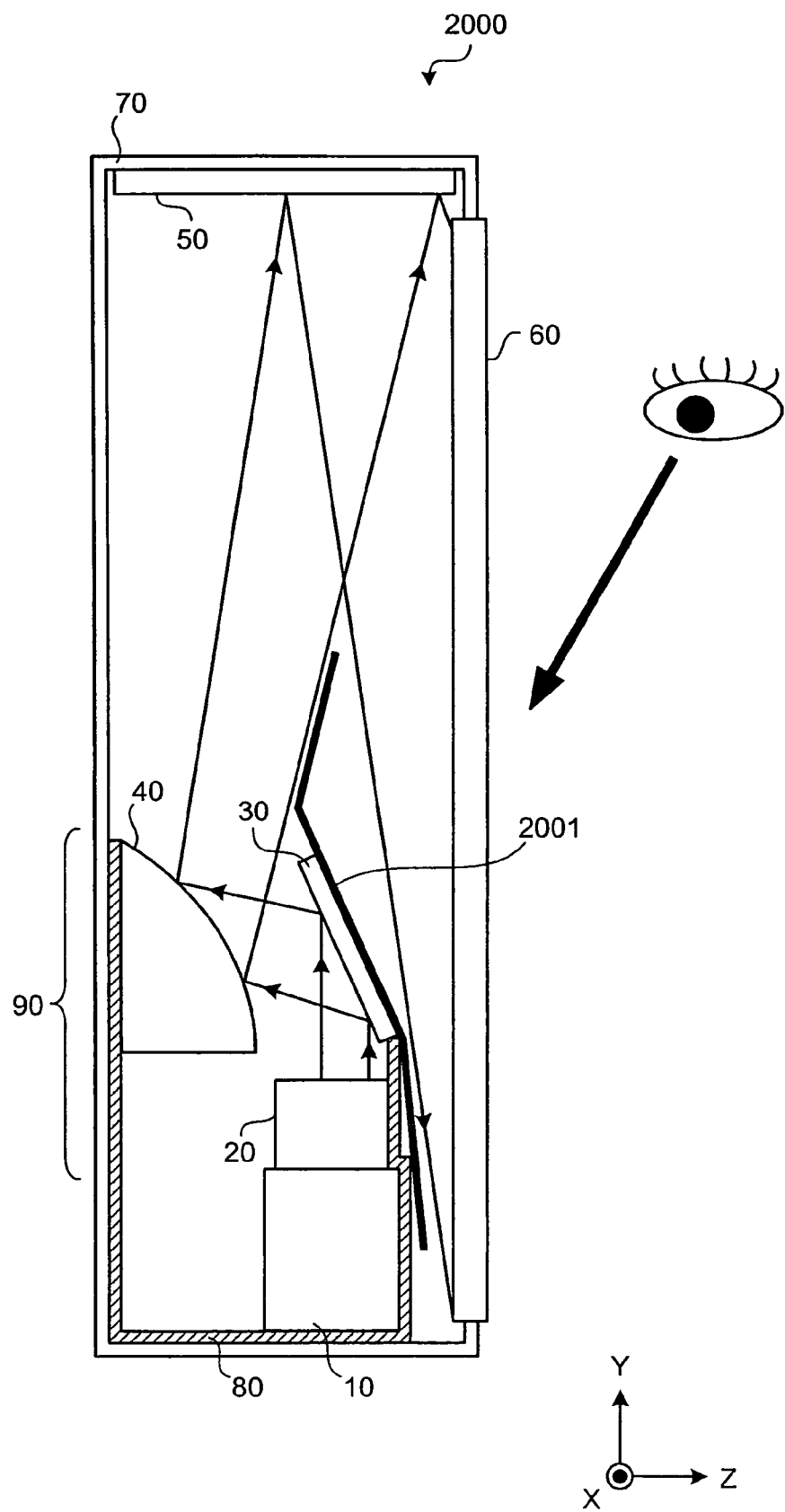
FIG. 20 is a diagram of a schematic structure of a projector according to a third embodiment of the present invention.

FIG. 20 is a diagram of a schematic structure of a projector 2000 that is an image display apparatus according to a third embodiment of the present invention. The projector 2000 according to this embodiment has a structure in which a light shielding section 2001 is added to the projector 100 (see FIG. 1) according to the first embodiment. Components identical with those in the first embodiment are denoted by identical reference numerals and signs and redundant explanations of the components are omitted. The light shielding section 2001 shields light directly traveling in the direction of the screen 60 from the projection optical system 90. The light shielding section 2001 is bonded to a surface on the opposite side of the surface of the first mirror 30 that reflects light from the optical engine unit 10. The light shielding section 2001 is formed in a shape obtained by bending a plate shape. An upper part of the light shielding section 2001 is bent not to block light traveling from the second mirror 40 to the third mirror 50. A lower part of the light shielding section 2001 is bent not to block light traveling from the third mirror 50 to the screen 60.

When there is light directly traveling in the direction of the screen 60 from the projection optical system 90, the position where the projection optical system 90 is provided may look bright via the screen 60. It is possible to reduce luminance unevenness of an image and obtain a high-quality image by shielding the light directly traveling in the direction of the screen 60 from the projection optical system 90 using the light shielding section 2001. It is possible to easily set the light shielding section 2001 by bonding the light shielding section 2001 to the first mirror 30. The first mirror 30 may be constituted by providing a reflective film in a part of the light shielding section 2001.

Figure 22:
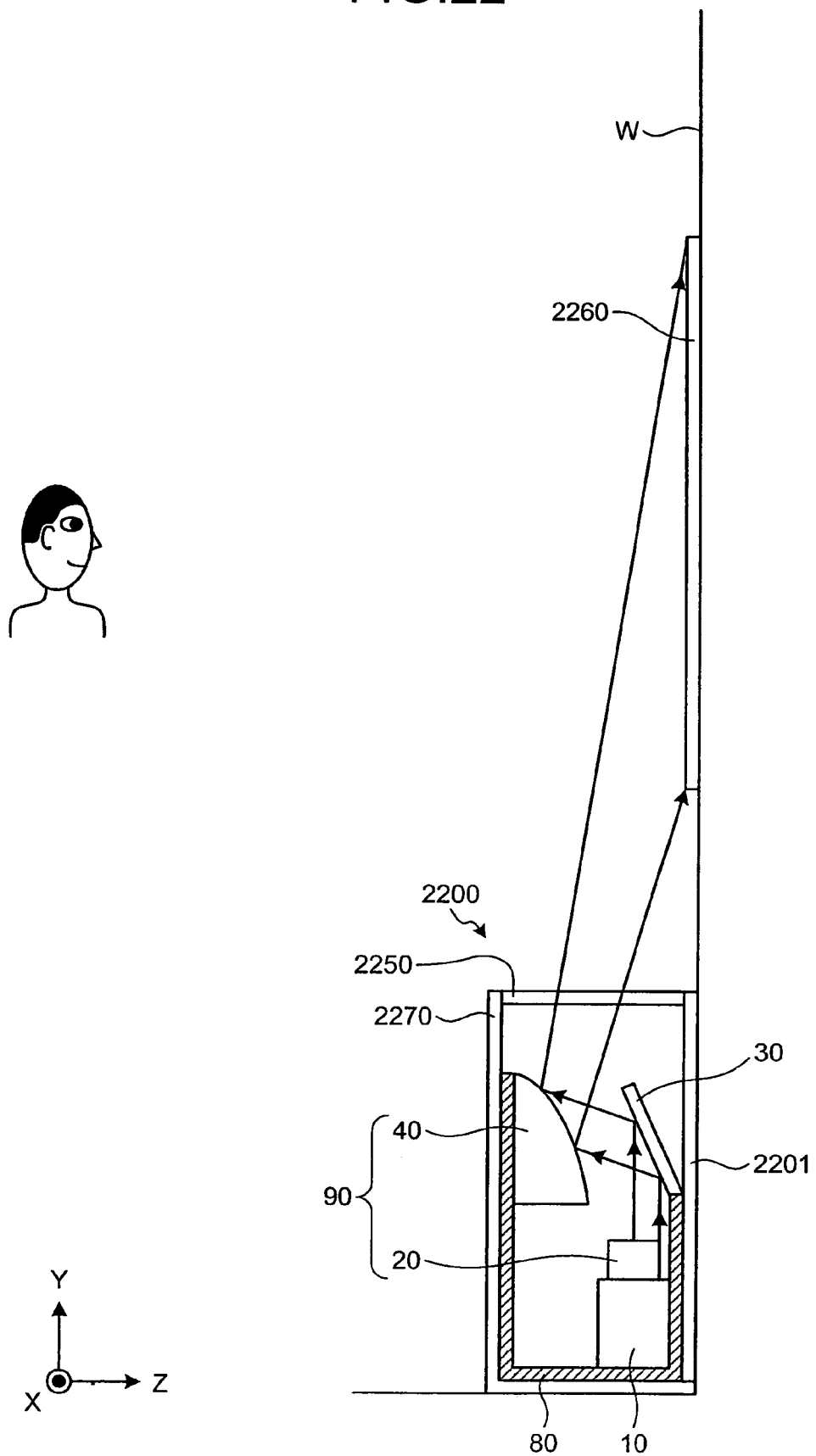
FIG. 22 is a diagram of a schematic structure of a projector according to a fourth embodiment of the present invention.

FIG. 22 is a diagram of a schematic structure of a projector 2200 that is an image display apparatus according to a fourth embodiment of the present invention. The projector 2200 is a projector of a so-called front projection type for projecting light corresponding to an image signal to a screen 2260 on the outside of the projector 2200 to allow a user to enjoy images by observing light reflected on the screen 2260. Components identical with those in the projector 100 according to the first embodiment are denoted by the identical reference numerals and signs and redundant explanations of the components are omitted except a part of the explanations.

A housing 2270 only has to be capable of housing at least the optical engine unit 10 and the projection optical system 90. It is possible to constitute the housing 2270 smaller than the housing 70 (see FIG. 1) in which the screen 60 is provide. A rear surface section 2201 constituting the housing 2270 is provided in a portion of the projector 2200 equivalent to the screen 60 (see FIG. 6) of the projector 100. The projector 2200 is set with the rear surface section 2201 directed to a side opposite to an observer side.

An emission port 2250 is provided in the top surface of the housing 2270 instead of the third mirror 50 (see FIG. 1) of the projector 100. The emission port 2250 emits light from the second mirror 40 to the outside of the housing 2270. The emission port 2250 is constituted by a transparent member such as glass. Light reflected on the second mirror 40 is transmitted through the emission port 2250 and made incident on the screen 2260 serving as a surface to be irradiated. The screen 2260 diffuses the light in the direction of the observer. An opening portion may be formed in the housing 2270 as an emission port other than providing the emission port 2250 constituted by the transparent member. When the emission port serving as the opening portion is provided, in the projector 100, a part of the projection optical system 90, for example, the second mirror 40 may be stuck out from the emission port. This makes it possible to further reduce a size of the projector 100.

The projector 2200 is arranged such that the optical axis of the projection lens 20 and the optical axis of the second mirror 40 are substantially parallel to a normal of the screen 2260. The projection optical system 90 causes light from the optical engine unit 10 to travel while being shifted to the specific side from the optical axis of the projection optical system 90. Like the projector 100 according to the first embodiment, the projector 2200 adopts the coaxial optical system and the shift optical system. Like the projector 100 according to the first embodiment, it is possible to constitute the projector 2200 according to this embodiment thin and make it easy to control a traveling direction of light by emitting light in the same direction along the screen 2260 serving as the surface to be irradiated.

As in the case of the first embodiment shown in FIG. 8, the incidence plane of the first mirror 30 and the portion of the second mirror 40 on which light from the first mirror 30 is made incident form substantially parallel lines in a section substantially orthogonal to the emission port 2250. The incidence plane of the first mirror 30 and the portion of the second mirror 40 on which the light from the first mirror 30 is made incident are substantially parallel. This makes it possible to set the first mirror 30 and the second mirror 40 close to each other and more accurately control a traveling direction of light. In this embodiment, as in the embodiments described above, spatial light modulators are provided in a position on which light traveling while being shifted to the specific side from an optical axis is made incident.

The projector 2200 causes both light traveling from the projection lens 20 to the first mirror 30 and light reflected on the second mirror 40 and, then, emitted from the emission port 2250 to travel in a direction along the rear surface section 2201. In this way, it is possible to reduce the thickness of the projector 2200 by using the projection optical system 90 same as that in the case of the first embodiment. The projection lens 20, the first mirror 30, and the second mirror 40 are integrally constituted as the support section 80. It is possible to easily fix the projection optical system 90 in the housing 2270 by making it possible to fit the support section 80 in the housing 2270.

By emitting projected light in the direction along the screen 2260 from the second mirror 40, it is possible to arrange the projector 2200 with the rear surface section 2201 closely attached to a wall surface W on which the screen 2260 is provided. By adopting the thin structure and making it possible to arrange the projector 2200 to be closely attached to the wall surface W, it is possible to surely prevent light traveling in the direction of the observer from the projector 2200 from being blocked by the projector 2200 or the observer. It is possible to place and use the projector 2200, for example, in a position of a floor surface near the wall surface W or on a special-purpose stand, a desk, or the like set near the wall surface W. The projector 2200 may be attached to the wall surface W and used. In this embodiment, as in the embodiments described above, it is desirable that the screen 2260 is capable of converting an angle of light made obliquely incident on the screen 2260 in the direction of the observer. It is possible to display a bright image by appropriately setting a traveling direction of light from the screen 2260.

By widening an angle of light in the second mirror 40, the projection optical system 90 is capable of performing ultra-short focus projection. It is possible to arrange the projector 2200 in a position close to the screen 2260 and arrange the projector 2200 at a high degree of freedom by performing the ultra-short focus projection. Consequently, there is an effect that it is possible to easily set the projector 2200 at a high degree of freedom and accurately cause the light to travel to display an image. The inventor has confirmed that it is possible to display a 57-inch image with the projector 2200 set in a position within 30 centimeters from the wall surface W by making it possible to perform the ultra-short focus projection. In this way, it is possible to easily obtain a large image with the projector 2200 according to this embodiment.

In general, the conventional projector of the front projection type is arranged in a position opposed to a screen, for example, near the center of a room space. In a usual room, it is often difficult to secure an installation position where no blocking object is present between the center of the room space to a wall surface. On the other hand, since it is possible to arrange the projector 2200 of the present invention near the wall surface W on which the screen 2260 is provided, it is easy to secure an installation position. To prevent projected light from being blocked by an observer or the like, the conventional projector may be set in a position higher than the observer by, for example, suspension from the ceiling. Compared with the case of the suspension from the ceiling, the projector 2200 of the present invention has advantages that, for example, it is possible to reduce labor and time for installation, it is possible to easily arrange cords, and maintenance such as replacement of lamps is simplified. In the case of the present invention, since it is also possible to arrange speakers near the projector 2200, it is also easy to arrange cords for connection with the speakers.

The observer usually observes an image from a position opposed to the screen. Therefore, conventionally, the projector of the front projection type is set in a position close to the observer. On the other hand, it is possible to set the projector 2200 of the present invention in a position closer to the wall surface W and apart from the observer. By setting the projector 2200 in the position apart from the observer, it is possible to reduce influences on the observer due to heat from a lamp serving as a heat source, rotation sound of a heat radiation fan, and the like. The observer can comfortably enjoy a video.

Since it is possible to set the projector 2200 of the present invention in a narrow space close to the wall surface W, the projector 2200 is suitable for effectively utilizing a space in a room. In addition to setting the projector 2200 every time the projector 2200 is used, it is also possible to permanently set the projector 2200 regardless of whether the projector 2200 is used. By making it possible to permanently set the projector 220, it is possible to make it unnecessary to perform installation work every time the projector 2200 is used and substantially reduce labor and time for adjustment of a projection distance and a size of an image. Moreover, when it is possible to arrange the projector 2200 in the space closer to the wall surface W, compared with the time when a projector is set in a position in a room space and opposed to a screen, it is easy to adapt the projector 2200 to designs and interiors in the room. In this way, according to the present invention, it is possible to solve many issues concerning an installation position and the like that are regarded as problems in the conventional projector of the front projection type.

In the projector 2200, as in the case of the second embodiment, a projection lens of a shape obtained by removing a part thereof may be used as at least one of the front-group lenses. This makes it possible to reduce a size of the projection lens and reduce a size of the projector 2200. It is possible to shift the projection lens in the direction of the first mirror. It is also possible to improve accuracy of the projection lens and easily reduce aberration by reducing the length of an optical path from the projection lens to the screen.

Figure 23:
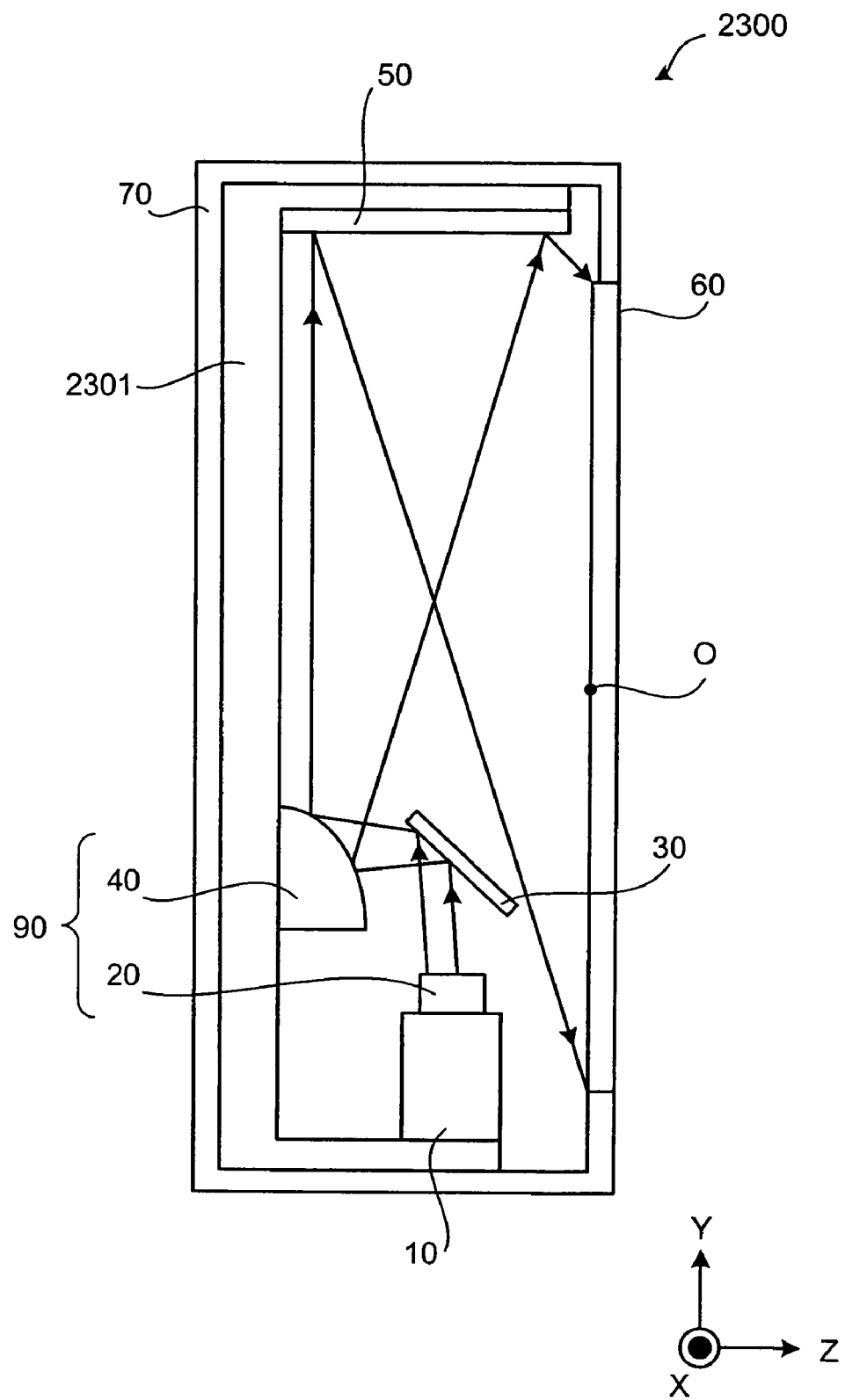
FIG. 23 is a diagram of a schematic structure of a projector according to a fifth embodiment of the present invention.

FIG. 23 is a diagram of a schematic structure of a projector 2300 that is an image display apparatus according to a fifth embodiment of the present invent ion. The projector 2300 is characterized by including a fixing section 2301. Components identical with those in the first embodiment are denoted by identical reference numerals and signs and redundant explanations are omitted. The projector 2300 is constituted by arranging the third mirror 50 on the upper side with respect to a center position O of the screen 60 and arranging the optical engine unit 10 and the projection optical system 90 on the lower side thereof. The housing 70 houses the optical engine unit 10, the projection optical system 90, and the third mirror 50.

Figure 24:
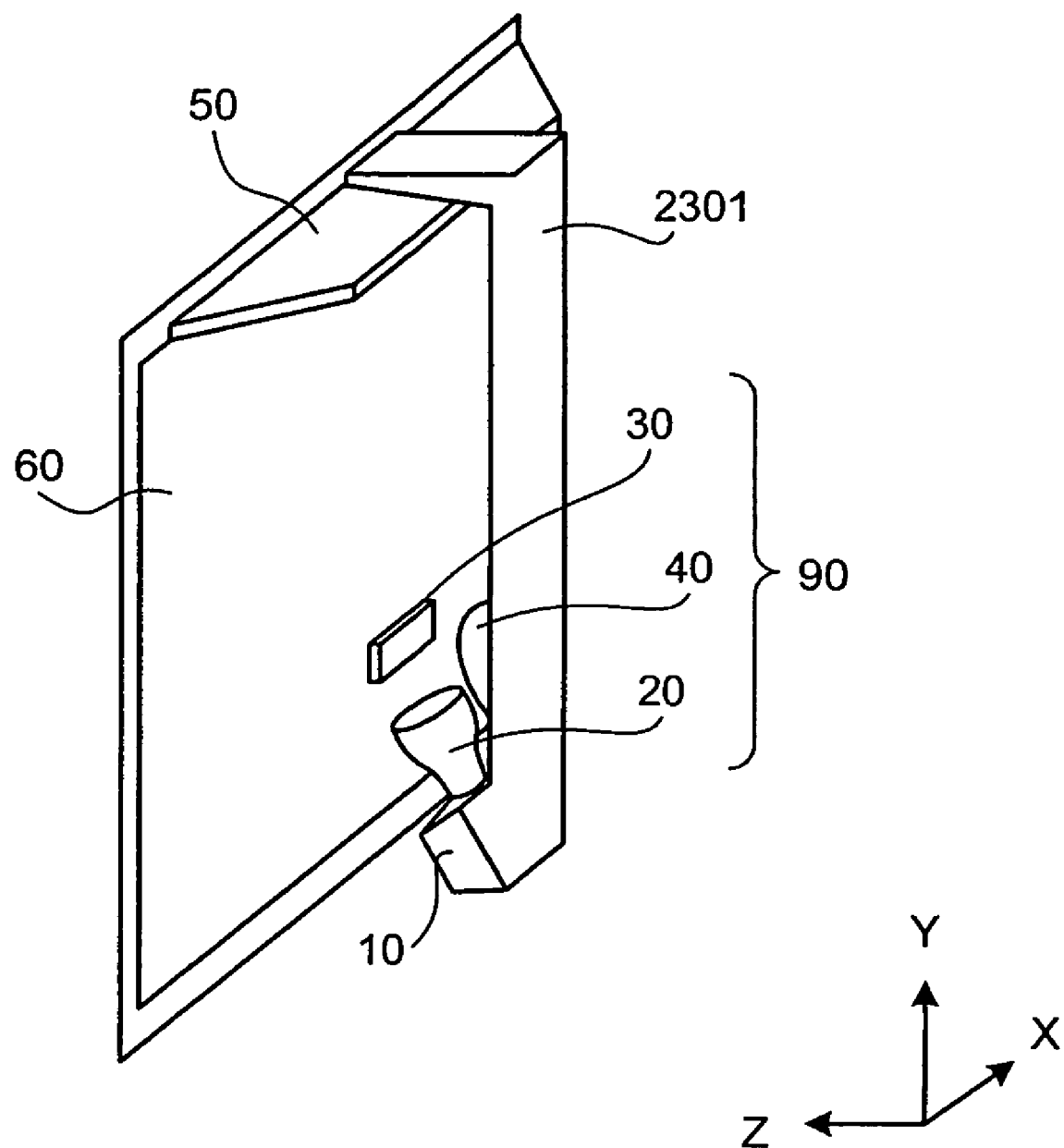
FIG. 24 is a diagram of a perspective structure of a screen and a fixing section.

FIG. 24 is a perspective structure of the screen 60 and the fixing section 2301. The fixing section 2301 integrally fixes the optical engine unit 10, the second mirror 40, and the third mirror 50. The fixing section 2301 can be formed by, for example, a metal member such as aluminum. By constituting the fixing section 2301 firm, the optical engine unit 10, the second mirror 40, and the third mirror 50 are positioned at high accuracy. The fixing section 2301 is fit in the housing 70 (see FIG. 23) in a state in which the fixing section 2301 fixes the optical engine unit 10, the second mirror 40, and the third mirror 50.

A loss of optical performance at the time when a positional relation among respective optical element is collapsed is larger as an angle of light is widened. When the respective optical elements are fixed to a housing, the positional relation among the respective optical elements easily changes if distortion or deflection occurs in the housing. Since the positional relation among the optical elements substantially affect the optical performance, it is extremely difficult to adjust an entire optical system only by fine-tuning a position of, for example, the optical engine unit 10 after the housing 70 is assembled.

According to this embodiment, it is possible to accurately determine relative positions of the optical engine unit 10, the second mirror 40, and the third mirror 50 with the fixing section 2301 as a reference by fixing the optical engine unit 10, the second mirror 40, and the third mirror 50 with the fixing section 2301. It is possible to position the optical engine unit 10, the second mirror 40, and the third mirror 50 at higher accuracy than that at the time when parts to which the optical engine unit 10, the second mirror 40, and the third mirror 50 are fixed, respectively, are combined to constitute a housing. It is possible to hold a positional relation among the optical engine unit 10, the second mirror 40, and the third mirror 50 at high accuracy and secure high optical performance by constituting the fixing section 2301 firm.

It is possible to constitute an optical system of the projector 2300 by completing adjustment of the optical engine unit 10, the second mirror 40, and the third mirror 50 with the fixing section 2301 and, then, fitting the fixing section 2301, to which the optical engine unit 10, the second mirror 40, and the third mirror 50 are fixed, in the housing 70. By building the optical engine unit 10, the second mirror 40, and the third mirror 50, the relative positions of which are determined by the fixing section 2301, in the housing 70, it becomes easy to perform positional adjustment with the other optical elements, for example, the screen 60. This makes it possible to easily and accurately assemble the optical system.

By providing the fixing section 2301 in the housing 70, it is possible to position the optical engine unit 10, the second mirror 40, and the third mirror 50 at high accuracy even if the housing 70 is not constituted firm and secure high optical performance. Since only the fixing section 2301 has to be constituted firm, compared with the time when the entire housing 70 is constituted firm, it is possible to reduce the thickness and the weight of the housing 70. Consequently, there is an effect that it is possible to display a high-quality image by securing high optical performance in the thin and light structure.

The projector 2300 is not limited to the structure for fixing the optical engine unit 10, the second mirror 40, and the third mirror 50 with the fixing section 2301. At least the optical engine unit 10 and the third mirror 50 have to be fixed by the fixing section 2301. It is desirable that at least one of the first mirror 30 and the second mirror 40 is fixed by the fixing section 2301. In the projector 2300, the support section 80 (see FIG. 1) according to the first embodiment may be fixed by the fixing section 2301. A member that has the function of the support section and the function of the fixing section by fixing all of the optical engine unit 10, the projection lens 20, the first mirror 30, the second mirror 40, and the third mirror 50 may be used.

In the projector 2300, the components in the housing 70 may be arranged reversely in the vertical direction. Even if the optical engine unit 10, which is considered heavy among the optical elements, is arranged in the upper part of the housing 70, it is possible to reduce deflection of the housing 70 by using the fixing section 2301. In this way, it is also possible to increase a degree of freedom in the structure of the projector 2300 by using the fixing section 2301.

The present invention is not limited to the embodiments described above. It is possible to carry out the present invention in various forms without departing from the spirit of the present invention. For example, modifications described below are possible.

(1) In the embodiments described above, light from the optical engine unit 10 is caused to travel while being shifted to the upper side on the paper surface in FIG. 5 with respect to the optical axis AX. However, in the present invention, the light from the optical engine unit 10 may be caused to travel while being shifted to the lower side on the paper surface in FIG. 5 with respect to the optical axis AX. When the light from the optical engine unit 10 is caused to travel while being shifted to the lower side on the paper surface in FIG. 5 with respect to the optical axis AX, a center normal of an image surface imaginarily formed on the emission surface of the cross dichroic prism 108 in the optical engine unit 10 only has to be parallel to the optical axis AX and shifted to the upper side on the paper surface in FIG. 5 with respect to the optical axis AX. A structure for shifting the light from the optical engine unit 10 to the inner side or the front side on the paper surface in FIG. 5 with respect to the optical axis AX is also applicable. In this case, the center normal of the image surface imaginarily formed on the emission surface of the cross dichroic prism 108 in the optical engine unit 10 only has to be set parallel to the optical axis AX and, then, the center normal of the image surface only has to be shifted to the front side or the inner side on the paper surface in FIG. 5 with respect to the optical axis AX.

(2) In the embodiments described above, the optical engine unit 10 includes the ultra-high-pressure mercury lamp 101 serving as the light source, the integrator 102, and the polarization converting element 103. However, in the present invention, the optical engine unit 10 only has to include one light source and one spatial light modulator as a minimum structure.

(3) In the projectors according to the embodiments described above, the ultra-high-pressure mercury lamp 101 is used as the light source unit of the optical engine unit 10.

However, the light source unit is not limited to this. For example, a solid-state light-emitting element such as a light-emitting diode element (LED) may be used.

(4) The integrator 102 according to the embodiments described above only has to have a function for making a luminance distribution of light from the light source substantially uniform. For example, a structure including two lens arrays that divide light from the light source into a plurality of partial light beams and a structure including a rod integrator that uses a columnar transparent member or a cylindrical reflection member are applicable.

(5) In the examples explained in the embodiments described above, the transmission-type liquid crystal display device is used as the spatial light modulator. However, in the present invention, a projector that uses a reflection-type liquid crystal display device as the spatial light modulator and a projector that uses a tilt mirror device may be adopted.

(6) In the examples explained in the embodiments described above, the three spatial light modulators are used. However, it is also possible to apply the present invention to a projector that uses one, two, or four or more spatial light modulators.

As described above, the image display apparatus according to the present invention is useful in displaying a large image using a thin structure.

What is claimed is:

1. An image display apparatus that displays an image using a light modulated according to an image signal, the image display apparatus comprising:
   a housing;
   a projection optical system that projects the light modulated according to the image signal from an optical engine unit, the projection optical system including
   a projection lens,
   a first mirror that reflects a light from the projection lens, and
   a second mirror that is formed on a rear surface of the housing, and widens an angle of a light from the first mirror by reflecting the light;
   a third mirror that is provided on a top surface of the housing, and reflects a light from the projection optical system; and
   a screen that is provided on a front surface of the housing, and transmits a light from the third mirror, wherein
   the projection lens and the second mirror are arranged in such a manner that an optical axis of the projection lens substantially matches an optical axis of the second mirror, and shift the light from the optical engine unit to a specific side from the optical axis of the projection lens.

2. The image display apparatus according to claim 1, wherein
   an optical axis of the screen substantially matches the optical axis of the projection lens and the optical axis of the second mirror.

3. The image display apparatus according to claim 1, wherein
   shapes of the first mirror and the second mirror are aligned in such a manner that an incidence plane of the first mirror and a portion of the second mirror on which the light from the first mirror is incident form a substantially parallel line in a cross section that includes a normal of the screen and that is substantially orthogonal to the third mirror.

4. The image display apparatus according to claim 1, wherein
   a light beam traveling from the second mirror to the third mirror is substantially parallel to the screen.

5. The image display apparatus according to claim 1, wherein
   the projection optical system is configured in such a manner that the light from the projection lens, which is deflected at about 90 degrees by the first mirror, is incident on the second mirror.

6. The image display apparatus according to claim 1, wherein
   the projection optical system is configured by integrating the projection lens, the first mirror, and the second mirror.

7. The image display apparatus according to claim 1, wherein
   the third mirror is provided near an outer edge of the screen, and
   the optical engine unit is arranged on an opposite side of a side where the third mirror is provided, with respect to a center of the screen.

8. The image display apparatus according to claim 1, wherein
   both a light traveling from the projection lens to the first mirror and a light traveling from the second mirror to the third mirror travel in a direction along the screen.

9. The image display apparatus according to claim 1, wherein
   the optical engine unit is arranged in a position near the screen other than a position where a light is incident on the screen from the third mirror.

10. The image display apparatus according to claim 1, wherein
    the screen includes an angle converting unit that converts an angle of the light from the third mirror, and
    the angle converting unit includes
    a first surface on which the light from the third mirror is incident, and
    a second surface that reflect a light from the first surface.

11. The image display apparatus according to claim 10, wherein
    the angle converting unit includes a plurality of prism sections each of which is formed by the first surface and the second surface, and
    gradients of the first surfaces and gradients of the second surfaces of each of the prism sections are made uniform.

12. The image display apparatus according to claim 10, wherein
    an angle of the third mirror with respect to a normal of the screen is equal to or larger than 0 degree and equal to or smaller than 10 degrees.

13. The image display apparatus according to claim 1, wherein
    the optical engine unit includes a spatial light modulator that modulates a light according to the image signal, and
    the spatial light modulator is provided in a position on which a light that is shifted to a specific side from the optical axis is incident.

14. The image display apparatus according to claim 1, wherein
    the projection lens is in a shape in which a part of at least one of front-group lenses is removed.

15. The image display apparatus according to claim 1, further comprising:
    a light shielding unit that shields a light directly traveling in a direction from the projection optical system to the screen.

16. The image display apparatus according to claim 1, wherein the screen includes an angle converting unit that converts an angle of the light from the third mirror, the angle converting unit includes a plurality of prism sections each of which is formed by a first surface on which the light from the third mirror is incident and a second surface that reflect a light from the first surface, and the prism sections are arranged in a substantially concentric shape with the optical axis as a center.

17. An image display apparatus that displays an image by projecting a light modulated according to an image signal on a surface to be irradiated, the image display apparatus comprising:

a housing;

a projection optical system that is housed in the housing, and projects the light modulated according to the image signal from an optical engine unit, the projection optical system including a projection lens, a first mirror that reflects a light from the projection lens, and a second mirror that widens an angle of a light from the first mirror by reflecting the light, wherein the projection lens and the second mirror are arranged in such a manner that an optical axis of the projection lens substantially matches an optical axis of the second mirror, and shift the light from the optical engine unit to a specific side from the optical axis of the projection lens, the surface to be irradiated is on the outside of the housing, and both a light traveling from the projection lens to the first mirror and a light reflected on the second mirror travel in a direction along the surface to be irradiated.

18. The image display apparatus according to claim 17, wherein the optical axis of the projection lens and the optical axis of the second mirror are substantially parallel to a normal of the surface to be irradiated.

19. The image display apparatus according to claim 17, wherein an incidence plane of the first mirror and a portion of the second mirror on which the light from the first mirror is incident are substantially parallel to each other.

20. The image display apparatus according to claim 17, wherein the projection optical system is configured in such a manner that the light from the projection lens, which is deflected at about 90 degrees by the first mirror, is incident on the second mirror.

21. The image display apparatus according to claim 17, wherein the projection optical system is configured by integrating the projection lens, the first mirror, and the second mirror.

22. The image display apparatus according to claim 17, wherein the optical engine unit includes a spatial light modulator that modulates a light according to the image signal, and the spatial light modulator is provided in a position on which a light that is shifted to a specific side from the optical axis is incident.

23. The image display apparatus according to claim 17, wherein the projection lens is in a shape in which a part of at least one of front-group lenses is removed.

24. The image display apparatus according to claim 1, further comprising:

a fixing unit that integrally fixes the optical engine unit and the third mirror.

25. The image display apparatus according to claim 24, wherein the housing accommodates at least the optical engine unit, the projection optical system, and the third mirror, and wherein the fixing unit is provided in the housing.

26. The image display apparatus according to claim 24, wherein the fixing unit further fixes at least one of the first mirror and the second mirror.

* * * * *